(12) United States Patent
Ma

(10) Patent No.: US 12,173,510 B2
(45) Date of Patent: Dec. 24, 2024

(54) RETRACTABLE SHADE STRUCTURES

(71) Applicant: Qingdao Activa Shade Inc., Shandong (CN)

(72) Inventor: Zhun-An Ma, Ningbo (CN)

(73) Assignee: Qingdao Activa Shade Inc., Shandong (CN)

(*) Notice: Subject to any disclaimer, the term of this patent is extended or adjusted under 35 U.S.C. 154(b) by 478 days.

(21) Appl. No.: 17/453,394

(22) Filed: Nov. 3, 2021

(65) Prior Publication Data

US 2022/0136253 A1    May 5, 2022

Related U.S. Application Data

(60) Provisional application No. 63/109,467, filed on Nov. 4, 2020.

(51) Int. Cl.
*E04F 10/02* (2006.01)
*F16G 1/28* (2006.01)

(52) U.S. Cl.
CPC ............ *E04F 10/02* (2013.01); *F16G 1/28* (2013.01)

(58) Field of Classification Search
CPC ......... E04F 10/02; E04F 10/04; E04F 10/005; E04F 10/08; E04F 10/10; E04F 10/0607; F16G 1/28; E04H 15/54; E04H 15/58
See application file for complete search history.

(56) References Cited

U.S. PATENT DOCUMENTS

| | | | |
|---|---|---|---|
| 272,339 A | 2/1883 | Shuman | |
| 706,820 A | 8/1902 | Hansen | |
| 1,017,515 A | 2/1912 | Daus | |
| 1,095,452 A | 5/1914 | Clarke | |
| 1,389,002 A | 8/1921 | Turner | |
| 1,728,074 A * | 9/1929 | Nicholas | A47H 5/032 160/84.06 |
| 1,815,199 A | 7/1931 | Goldberg et al. | |
| 1,819,400 A | 8/1931 | Anton | |
| 1,823,649 A | 9/1931 | Goldberg et al. | |
| 1,824,188 A | 9/1931 | Anton | |
| 1,948,788 A | 2/1934 | Goldberg et al. | |
| 2,038,045 A | 4/1936 | Heiser | |
| 2,038,259 A | 4/1936 | Anton | |

(Continued)

FOREIGN PATENT DOCUMENTS

| | | |
|---|---|---|
| AT | 144587 B | 2/1936 |
| CH | 625300 | 9/1981 |

(Continued)

*Primary Examiner* — Johnnie A. Shablack
(74) *Attorney, Agent, or Firm* — Knobbe Martens Olson & Bear, LLP

(57) ABSTRACT

A shade structure is provided that includes a frame assembly, a retractable shade assembly, and a drive system. The frame assembly includes a plurality of upright poles and a plurality of beams coupled therewith. The retractable shade assembly is coupled with the plurality of beams. The retractable shade assembly includes a shade section assembly that has a plurality of elongate bars and a shade section extending therebetween. The elongate bars are spread apart from each other to spread the shade section in an extended shade configuration. The elongate bars are moved toward each other in a retracted configuration wherein the shade section looped vertically between adjacent elongate bars.

26 Claims, 22 Drawing Sheets

(56) References Cited

U.S. PATENT DOCUMENTS

| | | | |
|---|---|---|---|
| 2,144,827 A | | 1/1939 | Anton |
| 2,193,921 A | * | 3/1940 | Gibbons .................. E04B 1/76 47/17 |
| 2,214,371 A | | 9/1940 | Heiser |
| 2,596,658 A | | 5/1952 | Azzo |
| 2,679,289 A | | 5/1954 | Loos |
| 2,740,470 A | | 4/1956 | D'Azzo |
| 2,823,885 A | | 2/1958 | Azzo |
| 2,880,956 A | | 4/1959 | Beckstett |
| 2,942,291 A | | 6/1960 | Flint |
| 3,052,290 A | * | 9/1962 | Orloff .................... E04F 10/02 135/90 |
| 3,188,035 A | | 6/1965 | Owen |
| 3,481,073 A | * | 12/1969 | Yoshida .................. A01G 9/22 135/120.2 |
| 3,782,443 A | | 1/1974 | Clauss et al. |
| 3,923,074 A | | 12/1975 | Mckee |
| 3,991,805 A | | 11/1976 | Clauss |
| 4,038,788 A | * | 8/1977 | Claessens .............. E04B 7/166 52/2.17 |
| 4,062,146 A | * | 12/1977 | Grossman ................ A01G 9/22 47/DIG. 6 |
| 4,077,416 A | | 3/1978 | Lux |
| 4,183,687 A | | 1/1980 | Bramwell |
| 4,214,621 A | | 7/1980 | Wessels et al. |
| 4,469,159 A | | 9/1984 | Lohausen |
| 4,479,526 A | | 10/1984 | Rinaldi et al. |
| 4,557,310 A | | 12/1985 | Castelaw et al. |
| 4,566,516 A | | 1/1986 | Lohausen |
| 4,590,642 A | | 5/1986 | Hesener |
| 4,673,017 A | | 6/1987 | Lauzier |
| 4,683,933 A | | 8/1987 | Dunbar |
| 4,784,204 A | | 11/1988 | Lohausen |
| 4,786,202 A | | 11/1988 | Arnold et al. |
| 4,953,609 A | | 9/1990 | Annin et al. |
| 5,029,363 A | | 7/1991 | Hesener |
| 5,119,867 A | | 6/1992 | Lukos |
| 5,133,397 A | | 7/1992 | Lohausen |
| 5,139,068 A | | 8/1992 | Lohausen |
| 5,232,036 A | | 8/1993 | Brutsaert |
| 5,265,373 A | | 11/1993 | Vollebregt |
| 5,273,095 A | | 12/1993 | Lukos |
| 5,307,856 A | | 5/1994 | Murray |
| 5,365,989 A | | 11/1994 | Bodentien et al. |
| 5,394,921 A | | 3/1995 | Lohausen |
| 5,752,556 A | | 5/1998 | Steadman |
| 5,794,679 A | * | 8/1998 | Williams ................ E06B 9/262 160/46 |
| 5,802,762 A | * | 9/1998 | Stonecypher ........... A01G 9/16 47/17 |
| 5,836,210 A | | 11/1998 | Lohausen |
| 5,924,466 A | | 7/1999 | Kroner et al. |
| 6,024,152 A | | 2/2000 | Rosenich |
| 6,024,153 A | | 2/2000 | Goldman |
| 6,032,909 A | | 3/2000 | Kroner |
| 6,125,905 A | * | 10/2000 | Woodside ........... E04F 10/0625 160/67 |
| 6,182,737 B1 | * | 2/2001 | Kuwabara ............. A01G 9/242 160/84.02 |
| 6,216,762 B1 | | 4/2001 | Lin |
| 6,484,069 B2 | | 11/2002 | Ab |
| 6,598,612 B1 | | 7/2003 | Crowe |
| 6,637,717 B2 | | 10/2003 | Li |
| 6,732,018 B2 | | 5/2004 | Ab |
| 6,739,371 B2 | | 5/2004 | Mukai |
| 6,763,874 B1 | | 7/2004 | Chen |
| 6,796,356 B2 | | 9/2004 | Kirby |
| 6,796,357 B2 | | 9/2004 | Kirby |
| 6,820,673 B2 | | 11/2004 | Wessels |
| 6,832,448 B2 | * | 12/2004 | Stefan .................. A01G 9/1407 47/17 |
| 6,874,558 B2 | | 4/2005 | Mester |
| 6,874,559 B1 | | 4/2005 | Hicks |
| 6,904,826 B2 | | 6/2005 | Hesener |
| 7,017,976 B1 | | 3/2006 | Rutherfors et al. |
| 7,117,565 B2 | | 10/2006 | Brutsaert |
| 7,163,042 B2 | | 1/2007 | Li |
| 7,179,009 B2 | | 2/2007 | Stimpfl et al. |
| 7,353,855 B2 | | 4/2008 | Collishaw |
| D568,662 S | | 5/2008 | Bohlen |
| 7,367,376 B2 | | 5/2008 | Forns |
| 7,371,180 B2 | | 5/2008 | Cymbal et al. |
| 7,451,797 B2 | | 11/2008 | Forns |
| 7,520,091 B2 | | 4/2009 | Friedman |
| 7,628,194 B2 | | 12/2009 | Wagner et al. |
| 7,645,088 B2 | | 1/2010 | Voss |
| 7,740,044 B2 | | 6/2010 | Gutierrez |
| 7,753,612 B2 | | 7/2010 | Bouru et al. |
| 7,789,122 B2 | | 9/2010 | Ito |
| D633,976 S | | 3/2011 | Corradi et al. |
| 8,042,596 B2 | | 10/2011 | Forns |
| 8,113,260 B2 | | 2/2012 | Forns |
| 8,141,613 B2 | | 3/2012 | Brutsaert |
| 8,205,656 B2 | | 6/2012 | Ma |
| 8,316,910 B2 | | 11/2012 | Popa et al. |
| 8,336,947 B2 | | 12/2012 | Chenowth |
| 8,347,935 B2 | | 1/2013 | Svirsky et al. |
| 8,356,652 B2 | * | 1/2013 | Westgarth ........... E04F 10/0655 160/46 |
| 8,418,279 B2 | * | 4/2013 | Coenraets ........... E04F 10/0648 4/502 |
| 8,469,078 B2 | | 6/2013 | Drew |
| 8,661,575 B2 | | 3/2014 | Chapus |
| 8,726,967 B2 | | 5/2014 | Forns |
| 8,800,214 B2 | | 8/2014 | Silberman et al. |
| 8,807,513 B2 | | 8/2014 | Volin |
| 9,038,648 B1 | | 5/2015 | Xie |
| 9,228,358 B2 | | 1/2016 | Homung |
| 9,249,576 B2 | * | 2/2016 | Westgarth ............... E04F 10/02 |
| 9,249,610 B2 | | 2/2016 | Reus |
| 9,255,441 B2 | * | 2/2016 | Shargani ............ E04F 10/0633 |
| 9,353,529 B2 | | 5/2016 | Richmeier |
| 9,469,996 B2 | | 10/2016 | Ma |
| 9,469,997 B2 | | 10/2016 | Thompson |
| 9,470,012 B2 | * | 10/2016 | Shargani ................ E04H 15/58 |
| 9,624,689 B2 | * | 4/2017 | Bailey .................. E04H 15/644 |
| 9,644,374 B2 | | 5/2017 | Ivic |
| 9,644,389 B2 | | 5/2017 | Xie |
| 9,831,366 B1 | | 11/2017 | Stribling et al. |
| 9,915,062 B2 | | 3/2018 | Forsland et al. |
| 9,938,723 B2 | | 4/2018 | Shargani |
| 10,006,206 B2 | | 6/2018 | Traub |
| 10,066,414 B2 | | 9/2018 | Ma |
| 10,094,122 B1 | | 10/2018 | Akbulut |
| 10,280,625 B2 | | 5/2019 | Byszenski et al. |
| 10,385,574 B2 | | 8/2019 | Thompson et al. |
| 10,428,549 B2 | | 10/2019 | Ma |
| 10,494,817 B2 | | 12/2019 | Bailey et al. |
| 10,560,050 B2 | | 2/2020 | Raghunathan |
| 10,604,940 B2 | | 3/2020 | Westgarth |
| 10,689,848 B2 | | 6/2020 | Castel |
| 10,914,068 B2 | * | 2/2021 | Shargani ................ E04F 10/06 |
| 10,954,689 B2 | | 3/2021 | Ma |
| 11,140,956 B2 | * | 10/2021 | Teblick .................. A47G 33/06 |
| 11,156,014 B1 | * | 10/2021 | He ....................... E04F 10/02 |
| 11,613,894 B2 | | 3/2023 | Ma |
| 11,834,837 B2 | * | 12/2023 | Wang .................... E04F 10/10 |
| 11,891,810 B2 | | 2/2024 | Ma |
| 2001/0027846 A1 | | 10/2001 | Osinga |
| 2002/0014315 A1 | | 2/2002 | Toffey |
| 2003/0000154 A1 | | 1/2003 | Ignazio |
| 2004/0016511 A1 | | 1/2004 | Mester |
| 2006/0005473 A1 | * | 1/2006 | Friedman ................ E04B 7/14 52/24 |
| 2006/0108819 A1 | | 5/2006 | Wagner et al. |
| 2006/0201635 A1 | | 9/2006 | Ridley et al. |
| 2007/0051476 A1 | | 3/2007 | Forns |
| 2007/0193700 A1 | | 8/2007 | Ornelas et al. |
| 2007/0199662 A1 | | 8/2007 | Miller |
| 2007/0246168 A1 | | 10/2007 | Ito |
| 2008/0053624 A1 | | 3/2008 | Ito |
| 2008/0135145 A1 | | 6/2008 | Hsieh et al. |

(56) References Cited

U.S. PATENT DOCUMENTS

| | | |
|---|---|---|
| 2008/0142064 A1* | 6/2008 | Maraki .................. E04F 10/02 135/121 |
| 2008/0277073 A1 | 11/2008 | Ito |
| 2009/0025887 A1 | 1/2009 | Ito |
| 2009/0031641 A1* | 2/2009 | Grazioso ................ F24S 30/20 52/173.3 |
| 2009/0050277 A1 | 2/2009 | Ito |
| 2010/0032106 A1 | 2/2010 | Ma |
| 2012/0134611 A1 | 5/2012 | Voss |
| 2012/0273144 A1 | 11/2012 | Forns |
| 2013/0118696 A1 | 5/2013 | Gavish |
| 2013/0126104 A1 | 5/2013 | Weber |
| 2013/0149023 A1 | 6/2013 | Wiecko |
| 2014/0251552 A1 | 9/2014 | Ma |
| 2017/0025990 A1 | 1/2017 | Mastrogiannis |
| 2017/0321427 A1 | 11/2017 | Thompson et al. |
| 2018/0102734 A1 | 4/2018 | Katz |
| 2018/0106046 A1 | 4/2018 | Castel |
| 2018/0320381 A1 | 11/2018 | Ma |
| 2018/0363366 A1 | 12/2018 | Ammerlaan et al. |
| 2019/0112832 A1 | 4/2019 | Larin et al. |
| 2019/0145107 A1 | 5/2019 | Byszenski et al. |
| 2019/0177980 A1 | 6/2019 | Ma |
| 2019/0323232 A1 | 10/2019 | Mitchell |
| 2019/0330837 A1 | 10/2019 | Nicholas |
| 2019/0368201 A1 | 12/2019 | Thompson et al. |
| 2020/0087912 A1 | 3/2020 | Konings |
| 2020/0308841 A1 | 10/2020 | Bliss et al. |
| 2020/0354962 A1 | 11/2020 | Whytlaw |
| 2023/0228094 A1 | 7/2023 | Ma |
| 2024/0200336 A1 | 6/2024 | Ma |

FOREIGN PATENT DOCUMENTS

| | | |
|---|---|---|
| CN | 105 083 143 | 11/2015 |
| CN | 105888366 B | 4/2018 |
| DE | 2613583 | 3/1976 |
| DE | 2743748 | 4/1979 |
| DE | 31 10336 | 2/1982 |
| DE | 3801586 A1 | 8/1989 |
| DE | 199 49 215 | 4/2001 |
| DE | 202008006223 U1 | 9/2008 |
| DE | 20 2013 103994 | 11/2013 |
| EP | 0 001 592 | 2/1978 |
| EP | 0 119 550 | 9/1984 |
| EP | 0 810 336 | 12/1997 |
| EP | 1 092 820 | 4/2001 |
| EP | 1 342 864 | 9/2003 |
| EP | 1 609 926 | 12/2005 |
| EP | 1 767 721 | 3/2007 |
| EP | 1 895 070 | 3/2008 |
| EP | 1 995 391 | 11/2008 |
| EP | 2 071 982 | 6/2009 |
| EP | 2280129 A2 | 2/2011 |
| EP | 2 565 343 | 3/2013 |
| EP | 2565342 A1 | 3/2013 |
| EP | 2 607 570 | 6/2013 |
| EP | 1964998 B1 | 6/2014 |
| EP | 3 144 444 | 3/2017 |
| EP | 3 312 360 | 4/2018 |
| ES | 2 342 802 | 7/2010 |
| FR | 2163097 | 7/1973 |
| FR | 2564521 | 11/1985 |
| FR | 2682713 | 4/1993 |
| FR | 2766854 B1 | 10/1999 |
| FR | 2899659 | 10/2007 |
| GB | 2291901 A | 2/1996 |
| IT | MI20121972 A1 | 5/2014 |
| JP | S62-146828 | 9/1987 |
| JP | 2005213997 A | 8/2005 |
| JP | 5500613 B2 | 5/2014 |
| JP | 2014169563 A | 9/2014 |
| JP | 6128894 B2 | 5/2017 |
| JP | 2020180461 A | 11/2020 |
| KR | 101320445 B1 | 10/2013 |
| KR | 20130006147 U | 10/2013 |
| KR | 102009362 B1 | 8/2019 |
| WO | WO 1998/001638 | 1/1998 |
| WO | WO 2010/063386 | 6/2010 |
| WO | WO2013121448 A1 | 8/2013 |
| WO | WO2013144561 A1 | 10/2013 |
| WO | WO2014170510 A1 | 10/2014 |
| WO | WO2019038229 A1 | 2/2018 |
| WO | WO2018224704 A1 | 12/2018 |
| WO | WO2019150055 A1 | 8/2019 |
| WO | WO2019186213 A1 | 10/2019 |
| WO | WO2019238942 A1 | 12/2019 |
| WO | WO2020121356 A1 | 6/2020 |
| WO | WO2020121357 A1 | 6/2020 |
| WO | WO2020121358 A1 | 6/2020 |
| WO | WO2020174195 A1 | 9/2020 |

* cited by examiner

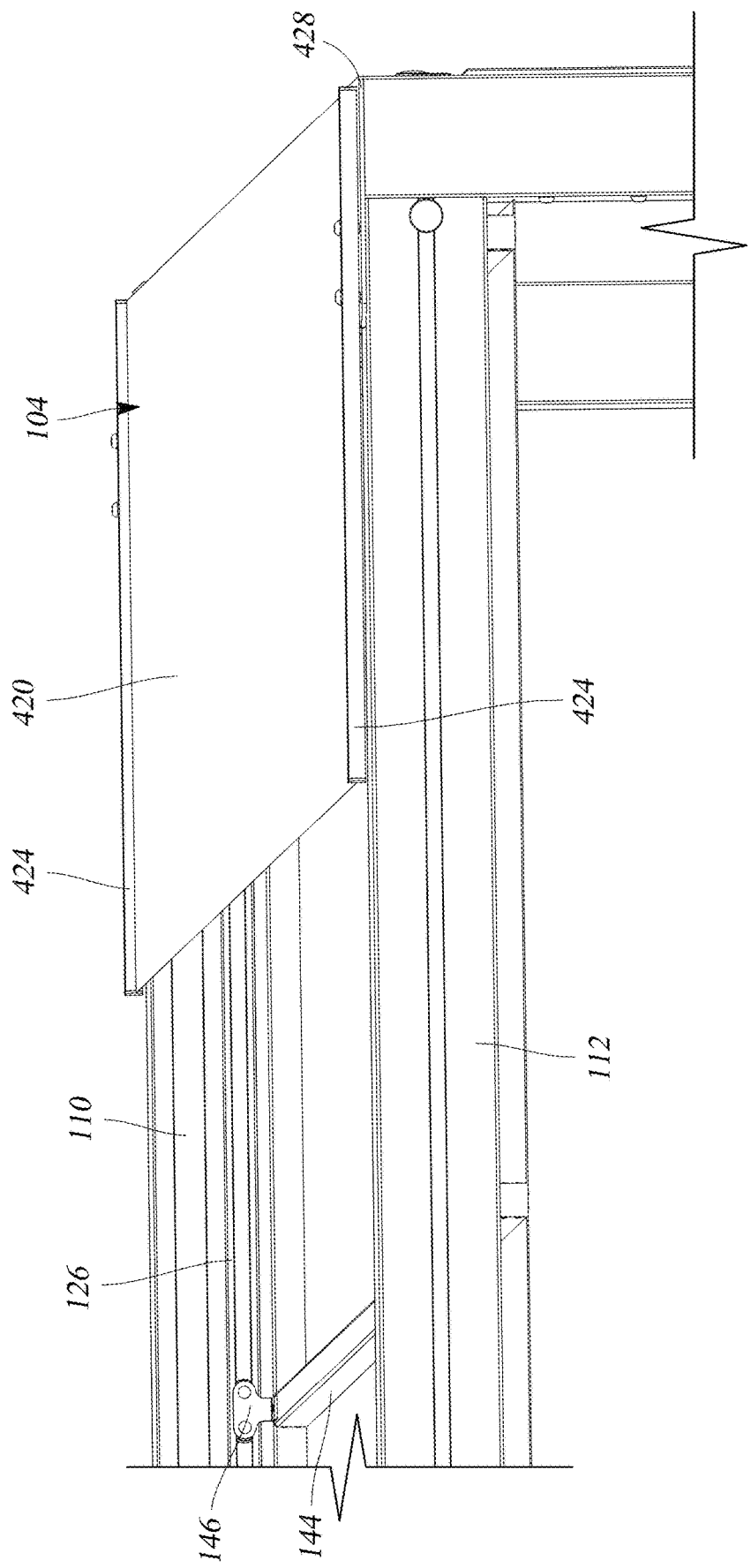

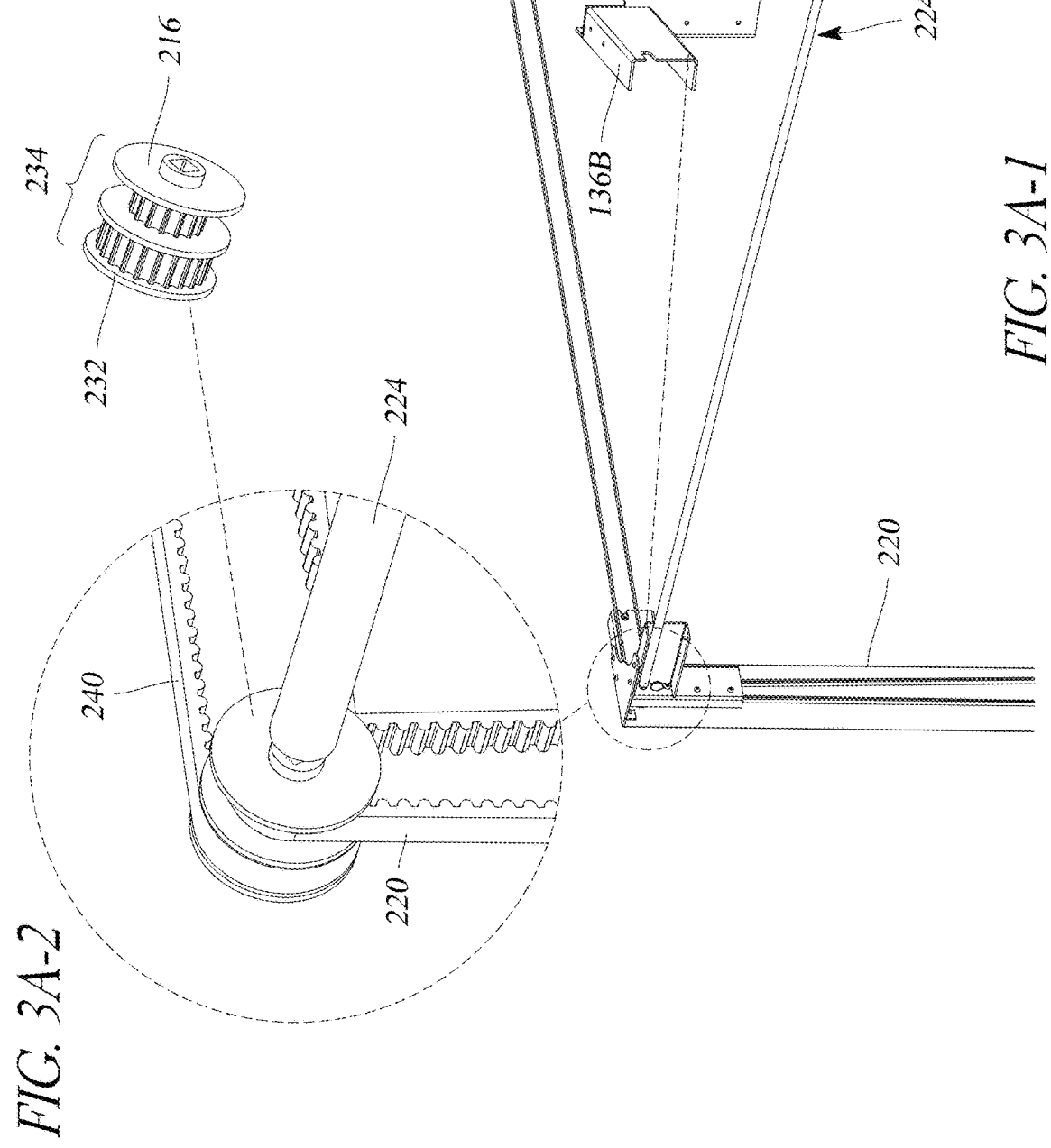

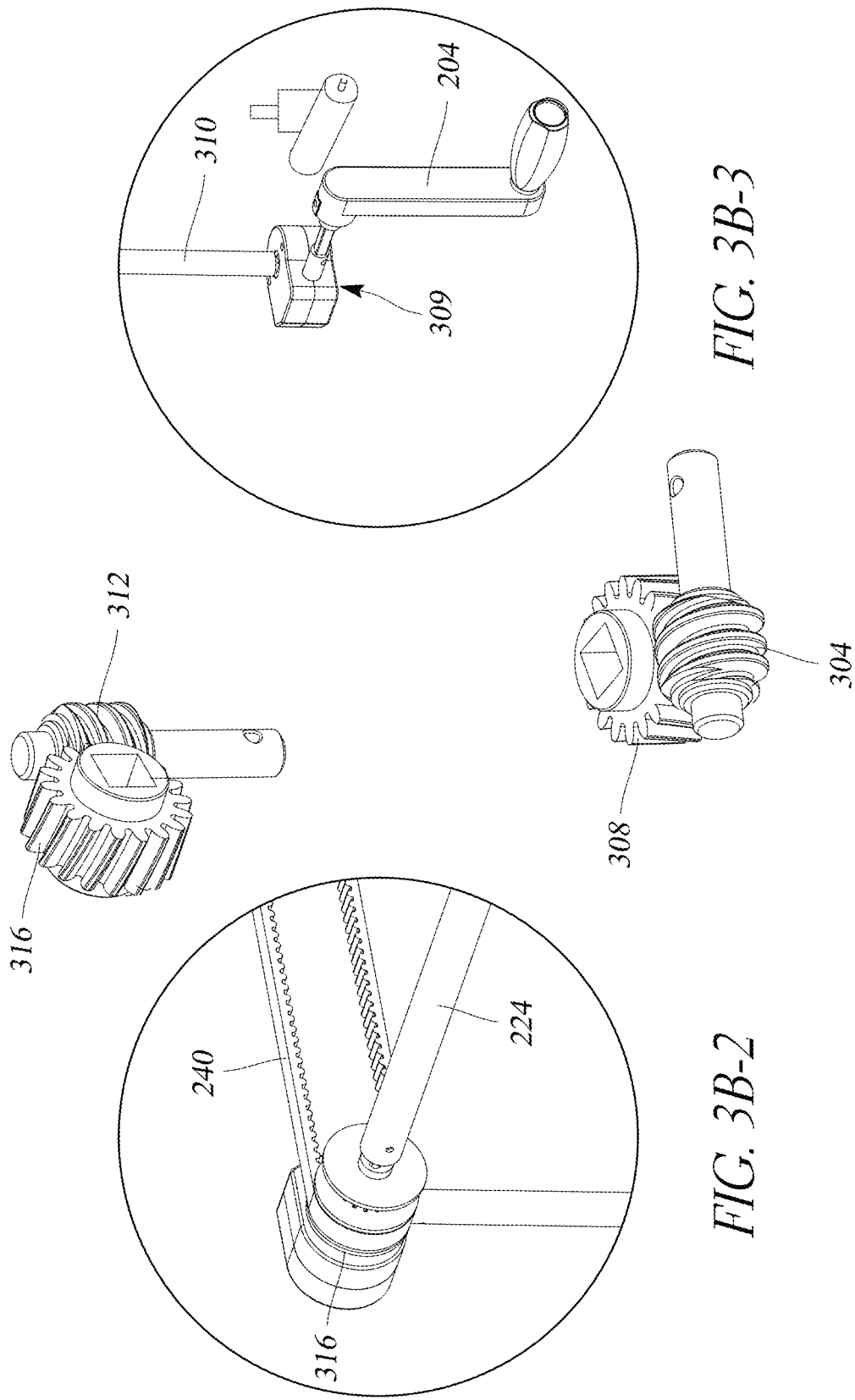

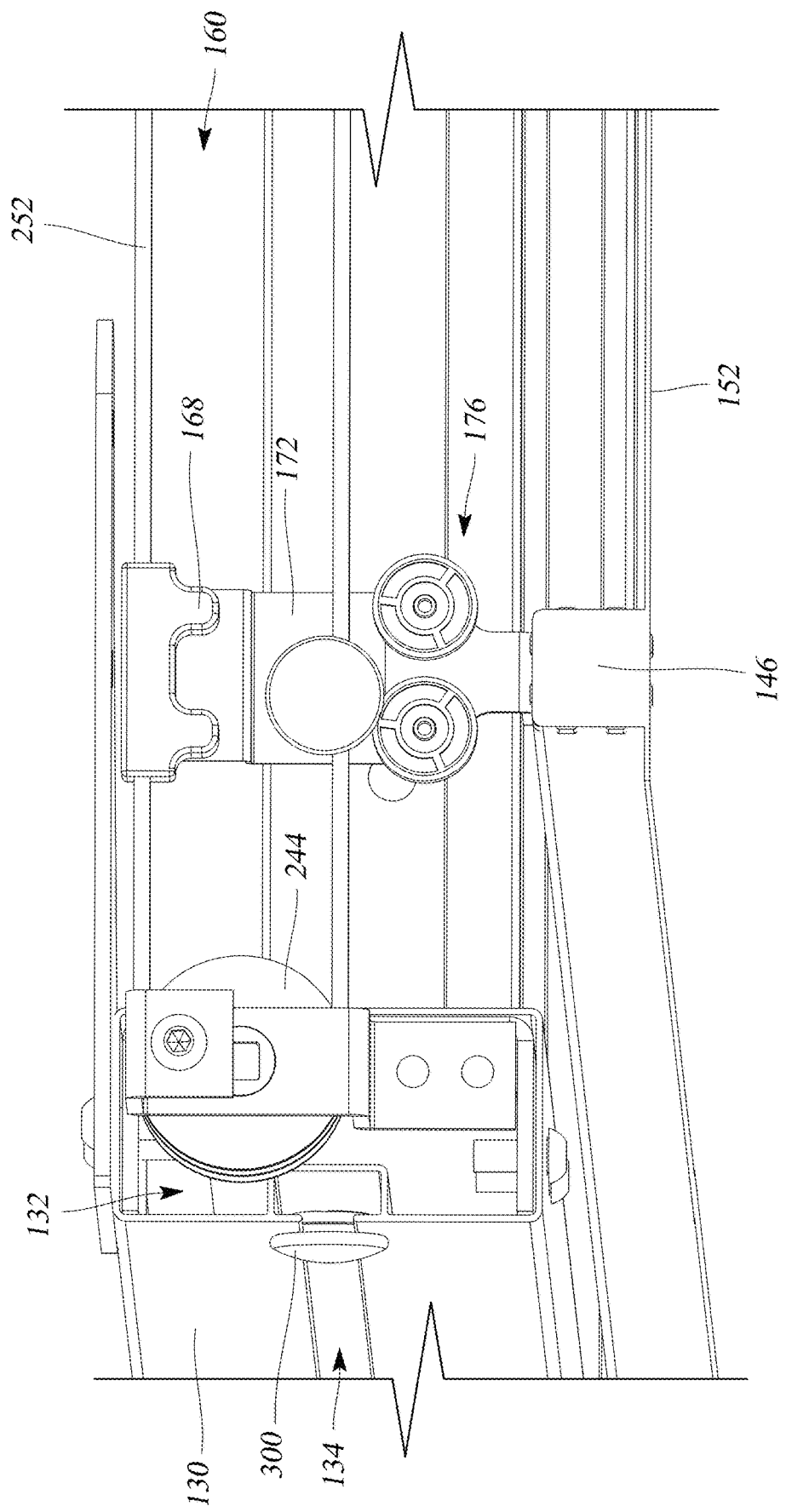

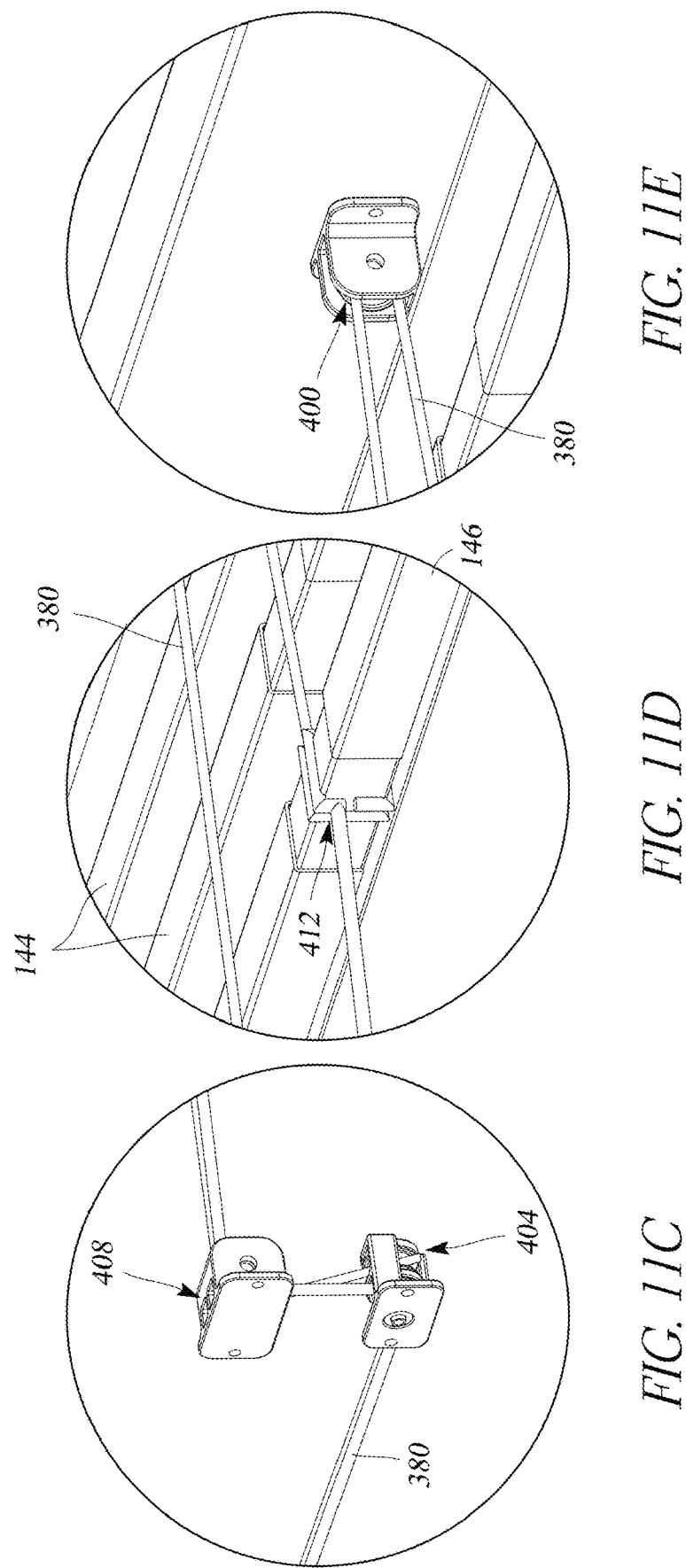

RETRACTABLE SHADE STRUCTURES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. § 1.57.

BACKGROUND OF THE INVENTION

Field of the Invention

This application is directed to shade structures that can be extended and retracted to enable a user to provide shade and an open view of the sky as desired.

Description of the Related Art

Umbrellas are well known to provide protection from the elements. While simple hand-held umbrellas provide convenient shelter from rain and sun, larger umbrellas can shade a larger area for shoppers in a market or diners in outdoor settings.

Providing shade for a large area is challenging in that the shade element must be robustly supported. Options for supporting a shade element include a central pole extending below the shade element, a frame mountable to a vertical surface such as a wall, and an awning mechanism with a roller, and collapsible frames for portable shade.

SUMMARY OF THE INVENTION

There is a need for improved ways to support a shade element. There is a need for improved shade element supports that can enable extension and retraction of a shade element. There is a need for simplified shade stowing arrangements that can reduce or eliminate the need for shade spools or rollers, which add weight, cost and are a focus of maintenance requirements. There is a need for retractable shade structures that can have enhanced longevity, with simplified design and reduced manufacturing complexity.

According to some embodiments, a shade structure comprises: a frame assembly comprising a plurality of upright poles and a plurality of beams coupled therewith; a retractable shade assembly coupled with the plurality of beams, the retractable shade assembly comprising a shade section assembly comprising a plurality of elongate bars and a shade section extending therebetween; a drive system configured to extend the retractable shade assembly to an extended shade configuration and to retract the retractable shade assembly to a retracted configuration; wherein the elongate bars are spread apart from each other to spread the shade section in the extended shade configuration and the elongate bars are moved toward each other in the retracted configuration with the shade section looped vertically between adjacent elongate bars.

In some embodiments, the drive system comprises a transmission configured to move the retractable shade assembly between the extended shade configuration and the retracted configuration. In some embodiments, the transmission comprises a plurality of gears and a belt disposed therebetween, the belt comprising teeth configured to mesh with teeth of the plurality of gears, the belt being coupled with a connection assembly coupled with the shade section assembly. In some embodiments, the connection assembly comprises a toothed member coupled with the teeth of the belt and a bracket coupled with a drive bar of the shade section assembly. In some embodiments, the bracket is rigidly coupled with the drive bar of the shade section assembly. In some embodiments, the connection assembly further comprises a guide coupled to the bracket, the guide being movably coupled to a guide channel of one of the plurality of beams. In some embodiments, the guide comprises a plurality of rollers. In some embodiments, the guide channel is positioned on a side of the one of the plurality of beams, and the guide channel comprises an elongate opening through which the guide extends, the elongate opening extending along the side of the one of the plurality of beams. In some embodiments, the plurality of gears is a first plurality of gears and the belt is a first belt, the first plurality of gears and the first belt being coupled with a first side beam, the transmission further comprising a second plurality of gears coupled with a second horizontal belt, the second horizontal belt being coupled with a second side beam. In some embodiments, the transmission further comprises a transmission shaft having a first end coupled to a gear of the first plurality of gears, and a second end coupled to a gear of the second plurality of gears. In some embodiments, the transmission shaft is positioned within an interior space of a beam that extends between the first side beam and the second side beam. In some embodiments, the drive system comprises a crank configured to apply a torque to the transmission, the crank being mechanically coupled to the transmission by a belt, a chain or a shaft. In some embodiments, the transmission comprises a plurality of sprockets and a chain disposed therebetween, the chain comprising links configured to mesh with the plurality of sprockets, the chain being coupled with a connection assembly coupled with the shade section assembly. In some embodiments, the plurality of beams includes two side beams each comprising one or more extrusions comprising a transmission channel configured to retain a portion of a transmission configured to move the retractable shade assembly between the retracted configuration and the extended shade configuration, and wherein one of the plurality of beams is a transverse beam disposed between and connecting the two side beams, the transverse beam comprising an extrusion comprising a transmission channel configured to retain a portion of the transmission configured to move the retractable shade assembly between the retracted configuration and the extended shade configuration. In some embodiments, the shade section comprises a plurality of looped sections formed between adjacent elongate bars, a first shade section disposed between first and second elongate bars, and a second shade section disposed between a third elongate bar and one of the first and second elongate bars. In some embodiments, the transmission includes a tension member configured move the elongate bars apart to spread the shade section apart in the extended shade configuration and to move the elongate bars toward each other in the retracted configuration, and wherein the transmission further comprises a spool coupled with a first end portion of the tension member, a second end portion of the tension member coupled with a drive bar, wherein winding the first end portion of the tension member around the spool causes an extension force to be applied to the drive bar, the spool unwinding the tension member upon application of a retraction force opposite the extension force, and wherein a portion of the tension member is suspended over the retractable shade assembly. In some embodiments, the shade structure further comprises a cover assembly supported by the frame assembly to shelter the shade section looped vertically in the retracted configuration.

According to some embodiments, a shade structure comprises: a frame assembly comprising a plurality of upright poles, a plurality of side beams coupled with top ends of the upright poles, and a front beam extending between two of the upright poles; a retractable shade assembly comprising a shade section assembly comprising a plurality of elongate bars, a drive bar, and a shade section, each of the elongate bars coupled with the side beams by a guide, the drive bar coupled with the side beams by a connection assembly; a drive system comprising a hand crank coupled to one of the upright poles and coupled with a transmission coupled with one or more of the side beams, the drive system being configured to operate the transmission to drive the drive bar to extend the retractable shade assembly to a shade configuration and to retract the retractable shade assembly to a retracted configuration; wherein the elongate bars are spread apart from each other to spread the shade section in the shade configuration and the elongate bars are moved toward each other in the retracted configuration with the shade section looped vertically between adjacent elongate bars.

In some embodiments, the transmission comprises a toothed belt coupled with a drive gear at one end and with a driven gear at a second end, the toothed belt coupled with a toothed member of the connection assembly coupled with the drive bar. In some embodiments, the connection assembly is rigidly coupled with the drive bar, and wherein the connection assembly comprises a plurality of rollers positioned within a guide channel on a side of a side beam. In some embodiments, the toothed belt comprises a first toothed belt, the toothed member comprises first toothed member coupled with a first end of the drive bar and wherein the transmission comprises a second toothed belt coupled with a second toothed member of a connection assembly coupled with a second end of the drive bar. In some embodiments, the first toothed belt and the toothed member are disposed in a transmission channel of a first extrusion and the second toothed belt and the second toothed member are disposed in a second transmission channel of a second extrusion. In some embodiments, the transmission comprises a chain, a gear driving drive shaft, or a string section disposed between the hand crank and a driven sprocket, a driven gear, or a pulley aligned with a channel disposed through one of the side beams and/or the front beam.

According to some embodiments, a shade structure comprises: a frame assembly comprising a plurality of upright poles and a plurality of beams coupled therewith; a retractable shade assembly coupled with the plurality of beams, the retractable shade assembly comprising a shade section assembly comprising a plurality of elongate bars and a shade section extending therebetween; and a drive system configured to extend the retractable shade assembly and to retract the retractable shade assembly, the drive system including a hand crank and a tension member having a first end configured to be wound by the hand crank and a second end coupled with a drive bar; wherein the elongate bars are spread apart from each other by tensioning the tension member on a first side of the drive bar to spread the shade section and the elongate bars are moved toward each other by tensioning the tension member on a second side of the drive bar.

In some embodiments, the drive bar is movably coupled at a first end of the drive bar to one of the plurality of beams by a connection assembly, the connection assembly comprising a guide positioned within a guide channel on a side of the one of the plurality of beams.

In one embodiment, a shade structure is provided that includes a frame assembly, retractable shade assembly, and a drive system. The frame assembly includes a plurality of upright poles and a plurality of beams coupled therewith. The retractable shade assembly is coupled with the plurality of beams. The retractable shade assembly includes a shade section assembly that has a plurality of elongate bars and a shade section extending therebetween. The drive system is configured to extend the retractable shade assembly to an extended shade configuration and to retract the retractable shade assembly to a retracted configuration. The elongate bars are spread apart from each other to spread the shade section in the extended shade configuration. The elongate bars are moved toward each other in the retracted configuration.

In some embodiments when the shade section can be looped vertically between adjacent elongate bars when the retractable shade assembly is in the retracted configuration.

The drive system can include one or more drive belts. A drive belt can be provided in an upright pole. A drive belt can be provided in one or more of the beams. A drive belt can be horizontally disposed in the shade structure. A belt can drive the extension and retraction of the retractable shade assembly. Two drive belts can be oriented horizontally and coupled with a drive bar such that rotation of the belts can shift the drive bar back and forth to extend and to retract the retractable shade assembly. The drive belt(s) can be disposed in a passage of a horizontal beam, e.g., of an extrusion thereof.

In another embodiment, a shade structure is provided that includes a frame assembly, and retractable shade assembly, and a drive system. The frame assembly has a plurality of upright poles, a plurality of side beams coupled with top ends of the upright poles, and a front beam that extends between two of the upright poles. The retractable shade assembly has a shade section assembly that includes a plurality of elongate bars, a drive bar, and a shade section. Each of the elongate bars is coupled with the side beams by a guide. The drive bar is coupled with the side beams by a connection assembly. The drive system includes a source of torque, such as a hand crank or a motor, coupled to one of the upright poles and coupled with a transmission. The transmission is coupled with one or more of the side beams. The drive system is configured to operate the transmission to drive the drive bar to extend the retractable shade assembly to a shade configuration and to retract the retractable shade assembly to a retracted configuration. The elongate bars are spread apart from each other to spread the shade section in the shade configuration and the elongate bars are moved toward each other in the retracted configuration. In some embodiments, the shade section is looped vertically between adjacent elongate bars when the retractable shade assembly is in the retracted configuration.

In another embodiment, a shade structure is provided that includes a frame assembly, a retractable shade assembly, and a drive system. The frame assembly has a plurality of upright poles and a plurality of beams coupled therewith. The retractable shade assembly is coupled with the plurality of beams. The retractable shade assembly has a shade section assembly comprising a plurality of elongate bars and a shade section extending therebetween. The drive system is configured to extend the retractable shade assembly and to retract the retractable shade assembly. The drive system includes a hand crank and a tension member that has a first end configured to be wound by the hand crank and a second end coupled with a drive bar. The elongate bars are spread apart from each other by tensioning the tension member on a first side of the drive bar to spread the shade section. The elongate bars are moved toward each other by tensioning the tension member on a second side of the drive bar.

The shade structures disclosed herein can include a cover assembly. The cover assembly can include a shelter layer. The shelter layer can include a planar member disposed over a location where a stowed shade section of a retractable shade assembly can be positioned. One or more guide channel can be spaced below and can extend under the location of the shelter layer. A length of the guide channel under the location of the shelter later can be sufficient to enable some or all of one or more shade section(s) to be moved to under the shelter layer. The shelter layer can be a fabric member that can be suspended, e.g., stretched over the guide channel length for stowing the retractable shade assembly. In one example, the shelter layer is coupled with cantilevered rods spaced apart on opposed sides of the retractable shade assembly. The cantilevered rods can be coupled with top surfaces of beams of the shade structures.

BRIEF DESCRIPTION OF THE DRAWINGS

These and other features, aspects and advantages are described below with reference to the drawings, which are intended to illustrate but not to limit the inventions. In the drawings, like reference characters denote corresponding features consistently throughout similar implementations. The following is a brief description of each of the drawings.

FIG. 2C is a top perspective detail view showing one embodiment of a cover panel assembly;

FIGS. 3A-1 and 3A-2 provide additional detail of one embodiment of a corner assembly and of a transmission including a belt and toothed gear arrangement;

FIGS. 3B-1-3B-5 provide additional detail of another embodiment of a corner assembly and of a transmission including a gear and drive shaft arrangement;

FIGS. 3C-1-3C-4 provide additional detail of another embodiment of a corner assembly and of a transmission including a chain drive arrangement;

FIG. 4 shows a portion of a transmission in connection with any of the embodiments disclosed herein, including a second drive member, e.g., belt;

FIG. 5 shows a hand crank portion of a transmission of any of the transmission disclosed herein;

FIG. 11A-11E are detail views of the shade structure shown in FIG. 11.

DETAILED DESCRIPTION OF THE PREFERRED EMBODIMENT

While the present description sets forth specific details of various implementations, it will be appreciated that the description is illustrative only and should not be construed in any way as limiting. Furthermore, various applications of such implementations and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

Figure 1:
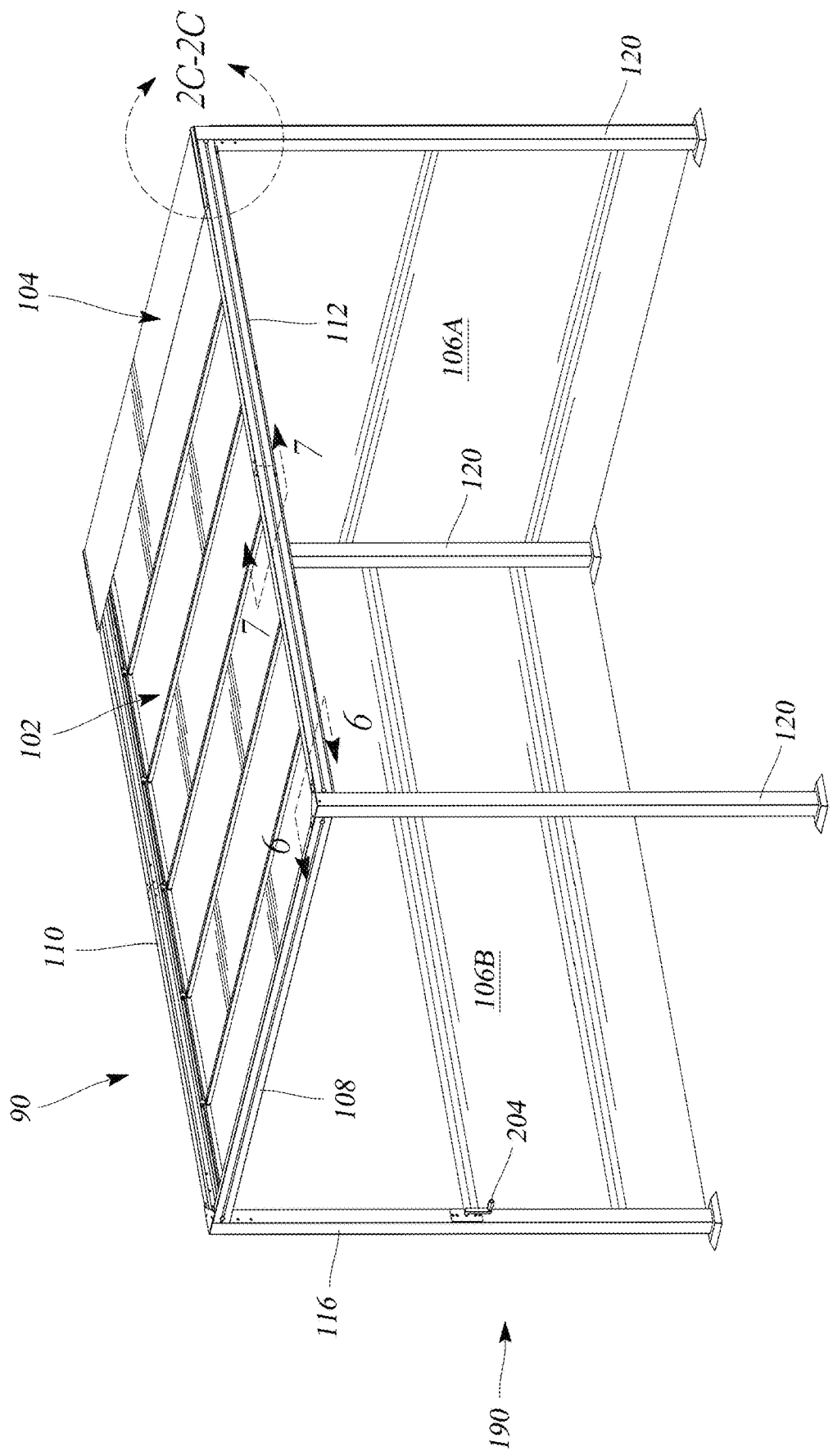
FIG. 1 is a front perspective view of a shade structure having a retractable shade assembly in an extended configuration in which shade is enhanced, which is one example of a shade configuration.

FIG. 1 shows a shade structure 90 that provides convenient shade and also enables a user to reduce, minimize or eliminate the shade when shade is not needed and/or a clear view of the sky is desired. The shade structure 90 includes a frame assembly 100 and a retractable shade assembly 102. Optional additional shade can be provided by a removable shade panel assembly 106A and/or a removable shade panel assembly 106B. The removable shade panel assembly 106A, 106B are discussed in greater detail below and can be made non-removable in some applications.

As discussed further below, the retractable shade assembly 102 can be configured to be extended to provide shade and to be retracted to provide open access to the sky. A cover assembly 104 can be provided to extend over the retractable shade assembly 102 when the assembly 102 is retracted. The cover assembly 104 will be discussed in further detail below in connection with FIG. 2C.

The frame assembly 100 can be configured to be secured to a ground surface. The frame assembly 100 can include a plurality of, e.g., four, upright poles. In one embodiment, the upright poles can include an upright pole 116 configured to house a portion of a drive system 190 and/or a portion of a transmission 200. The frame assembly 100 can also include a plurality of upright pole 120. The upright poles 116, 120 can be arranged in an array, e.g., in a polygonal, e.g., square or rectangular configuration. The upright poles 116, 120 are configured to support beams of the frame assembly 100. The upright poles 116, 120 can each include a bottom end 118A and a top end 118B. The bottom end 118A is configured to be secured to the ground surface, e.g., to hardscape, pavers or footings disposed in the ground surface. The top end 118B of the upright pole 116 can enclose, house or be disposed below and support a portion of the drive system 190 or the transmission 200. The top end 118B can be coupled with one or more beams of the frame assembly 100.

The frame assembly 100 can include horizontal support structure that can be coupled with the top end 118B of the upright pole 116 and the top end of the upright poles 120. The support structure can include a front beam 108, a first side beam 110, a second side beam 112, and a rear beam 114. One or more of the beams can be coupled directly or indirectly with one or more of the upright poles 116, 120. In one embodiment, the poles 116, 120 and the beams 110, 112 can comprise extrusions. For example, the side beam 110 and the side beam 112 can include one or more extrusion 122 that extend between the two of the upright poles. The front beam 108 can include one or more extrusion 130. The extrusions 122, 130 can include hollow members. In some cases the extrusions 122, 130 can include a plurality of discrete channels configured to house components of the shade structure 90, e.g., components of the transmission 200, as discussed below.

An extrusion connector 136 can be provided to connect two or more poles or beams together, e.g., to connect extrusions of the upright pole 116 to the front beam 108 and to the side beam 110. For example, the extrusion connector 136 can include a vertical branch 136A configured to couple with, e.g., to be inserted into, the upright pole 116. The vertical branch 136A can include two angle portions configured to slide into a corner segment of top end 118B of the upright pole 116, e.g., into a channel of an extrusion thereof. The extrusion connector 136 can include a front beam branch 136B configured to mate with a lateral end portion of the front beam 108. The front beam branch 136B can include a C-shaped end profile. The C-shaped end profile can partially surround a space within one segment of the extrusion 130, e.g., within a discrete channel thereof. In one embodiment the extrusion connector 136 can include a side beam branch 136C configured to be inserted into an end portion of the side beam 110 of the frame assembly 100. The side beam branch 136C can have a C-shaped end profile configured to be inserted into a space within one segment of the extrusion 122. The side beam branch 136C can be inserted into a discrete channel of the extrusion 122. The upright poles 120 can also be coupled with extrusion connectors 136 to connect the front beam 108 with the side beam 112 and/or one or both of the side beam 110 with the rear beam 114.

The retractable shade assembly 102 includes a shade section assembly 140 that is coupled with the frame assembly 100 and movable relative thereto to allow for a shade providing configuration and a retracted configuration. The shade section assembly 140 includes a plurality of elongate bars 144 that extend between the side beam 110 and the side beam 112. The elongate bars 144 each include opposite ends, one adjacent to the side beam 110 and one adjacent to the side beam 112. The shade section assembly 140 also can include a drive bar 146. The drive bar 146 can be of the same configuration as the elongate bars 144. In various embodiments the drive bar 146 is coupled to the drive system 190 (discussed below) to move the shade section assembly 140 relative to the frame assembly 100.

Figure 7:
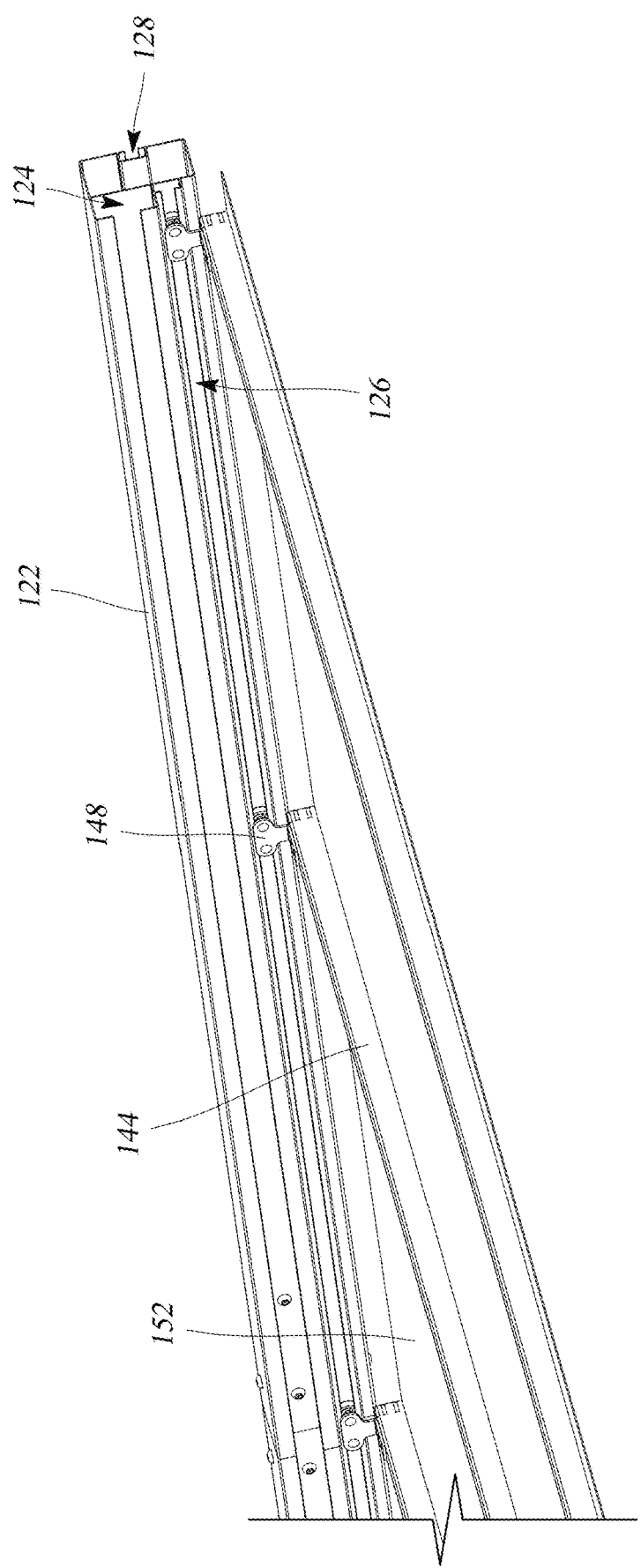
FIG. 7 is a cross-sectional view of the shade structure taken at the section plane 7-7 seen in FIG. 1.

The shade section assembly 140 also includes a plurality of guides 148. The guides 148 are coupled with opposing ends of the elongate bars 144. The guides 148 are coupled with the frame assembly 100. FIG. 7 shows that the guides 148 can be coupled with the extrusion 122, e.g., in guide channels 126 thereof. The guides 148 can include one or a plurality of rollers, e.g., two rollers, or sliders disposed in the guide channels 126. In one embodiment, there is a guide 148 disposed at each opposing end of each of the elongate bars 144. As the retractable shade assembly 102 moves relative to the frame assembly 100, the guides 148 of each shade section assembly 140 slides or rolls within the guide channel 126.

Figure 2:
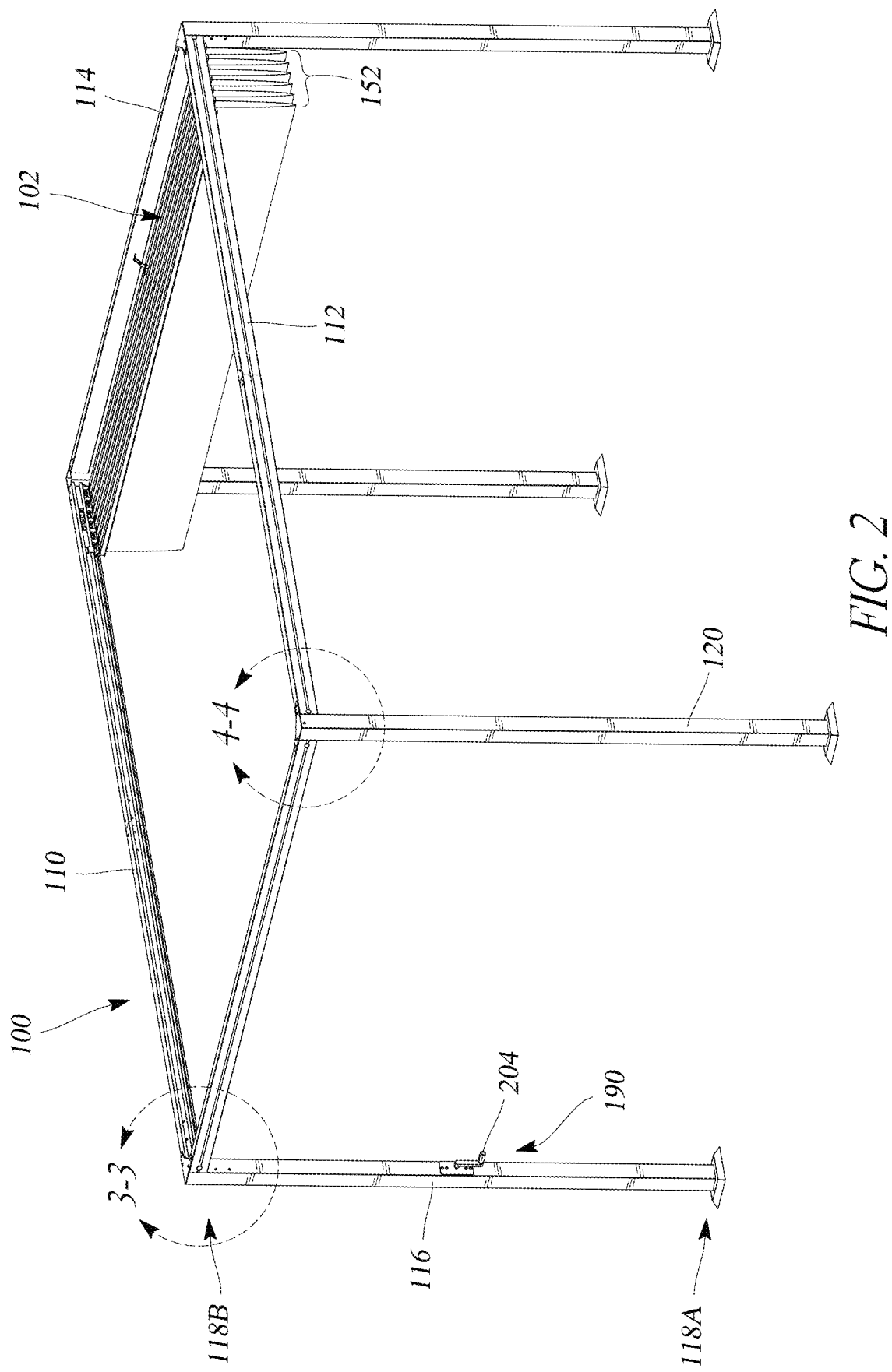
FIG. 2 is a front perspective view of the shade structure of FIG. 1 with the retractable shade assembly in a retracted configuration.

In one embodiment the shade section assembly 140 includes a shade section 152 disposed between adjacent elongate bars 144. The shade section 152 can include a fabric segment of the retractable shade assembly 102 that extend between adjacent elongate bars 144. The shade section 152 can include large sheets that span more than two adjacent elongate bars 144. The shade section 152 can include a single continuous sheet that spans all of the elongate bars. The drive bar 146 can be coupled with an adjacent elongate bar 144 by the shade section 152. The shade section 152 can be flexible such that when the retractable shade assembly 102 is retracted, the shade section 152 is looped vertically between adjacent elongate bars 144. FIG. 2 shows that the retracted configuration can include a plurality of looped vertical shade section 152.

The drive bar 146 is coupled with a transmission 200 of the shade structure 90 by a connection assembly 160. The connection assembly 160 includes a link assembly 164, a bracket 172, and a guide 176. The guide 176 can include a plurality of members to aid in movement of the retractable shade assembly 102 relative to the frame assembly 100. The guide 176 can include low friction member, e.g., rollers or sliders. The guide 176 can be disposed in the guide channel 126 of the extrusions 122. The bracket 172 can secure the guide 176 to the link assembly 164. The link assembly 164 can secure the connection assembly 160 to a portion of the transmission 200. As discussed further below, the link assembly 164 can be secured to a belt. The link assembly 164 can include a toothed member 168 configured to engage a belt. The link assembly 164 can include a chain engagement member, e.g., a flat array of sprocket teeth.

In one embodiment, one side of the retractable shade assembly 102 includes the connection assembly 160 coupled with a transmission component. In another embodiment, the drive bar 146 is coupled with a transmission component at each end. The drive bar 146 can be coupled to a drive belt, chain or other transmission component at each end by a connection assembly 160.

Figure 6:
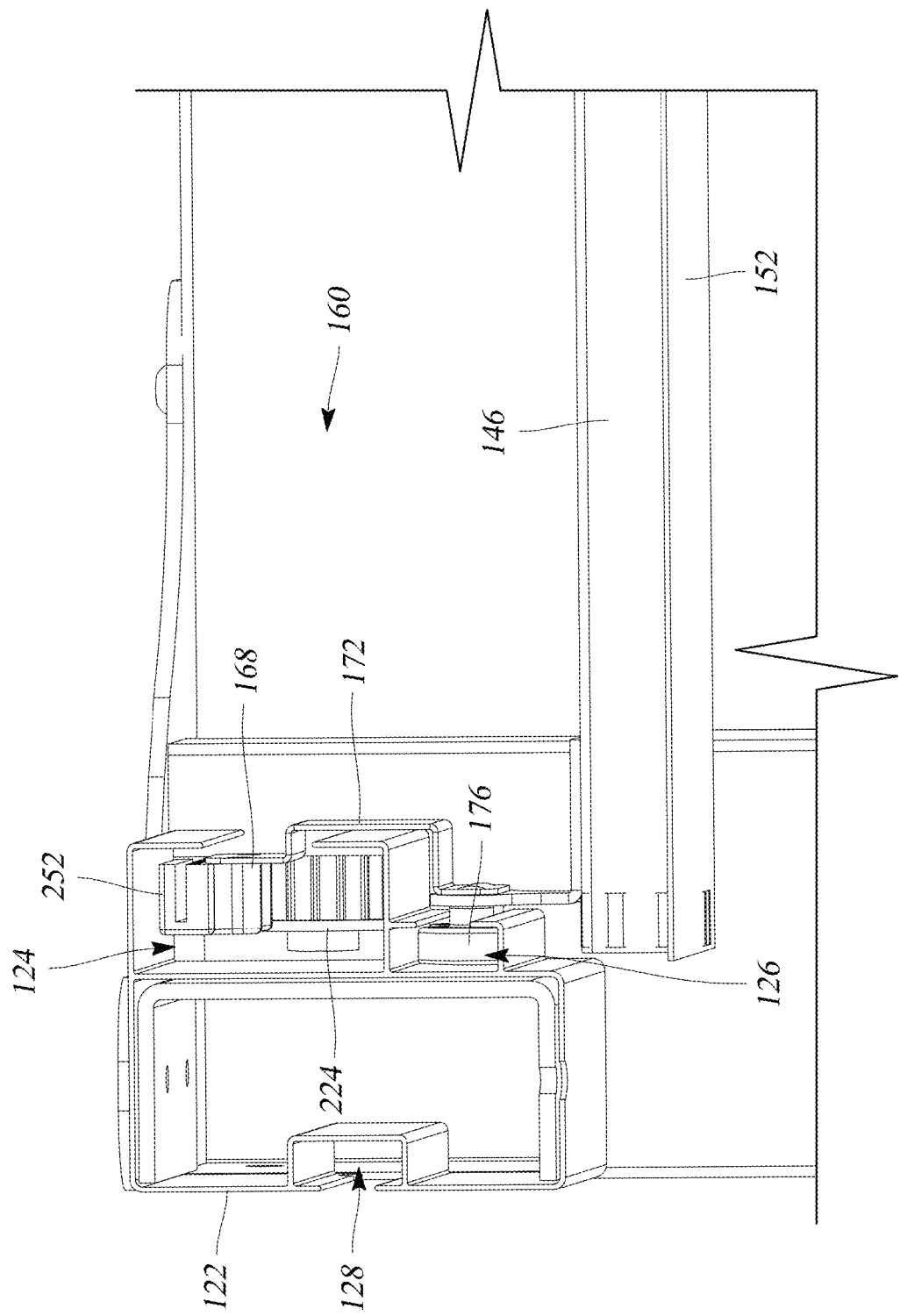
FIG. 6 is a cross-sectional view of the shade structure taken at the section plane 6-6 seen in FIG. 1.

FIG. 6 shows additional details of the connection between the shade section 152 and the frame assembly 100. The side beam 112 can include the extrusion 122, which in turn can include a guide channel 126 and a guide channel 128. As described above, the guide channel 126 can be configured to support one or more guides of the elongate bars 144. The connection assembly 160 can be provided to couple the shade section 152 with the guide channel 126 via a guide 176. The bracket 172 can couple with an end of the guide 176 that extends outside of the guide channel 126. The bracket 172 can be coupled at a first end with the guide 176 and at a second end with the toothed member 168. The toothed member 168 can include a first component with teeth to mesh with a belt and a second component configured to be coupled with the first component to form a unit about the belt. The guide 176 can be coupled with the drive bar 146. In one embodiment, an end of the guide 176 disposed outside the guide channel 126 can be coupled with the drive bar 146 by an angle bracket. FIG. 4 shows an end of the drive bar 146 opposite to the end shown in FIG. 6. The connection between the end of the drive bar 146 shown in FIG. 4 can be the same as that of the end of the drive bar 146 shown in FIG. 6.

FIGS. 2-3A-1 show additional details of a transmission 200 that can be engaged by a drive system 190 to move the retractable shade assembly 102 between the retracted and the extended (shade providing) configurations. The drive system 190 can include any control mechanism that a user can engage to cause movement of other components of the transmission 200. In the illustrated embodiment, the drive system 190 includes a hand crank 204 which can engage the drive system 190 to move the retractable shade assembly 102. The hand crank 204 can be disposed on the upright pole 116. In the illustrated embodiment, the upright pole 116 is located on a short side of a rectangular array of upright poles of the shade structure 90.

Figure 2A:
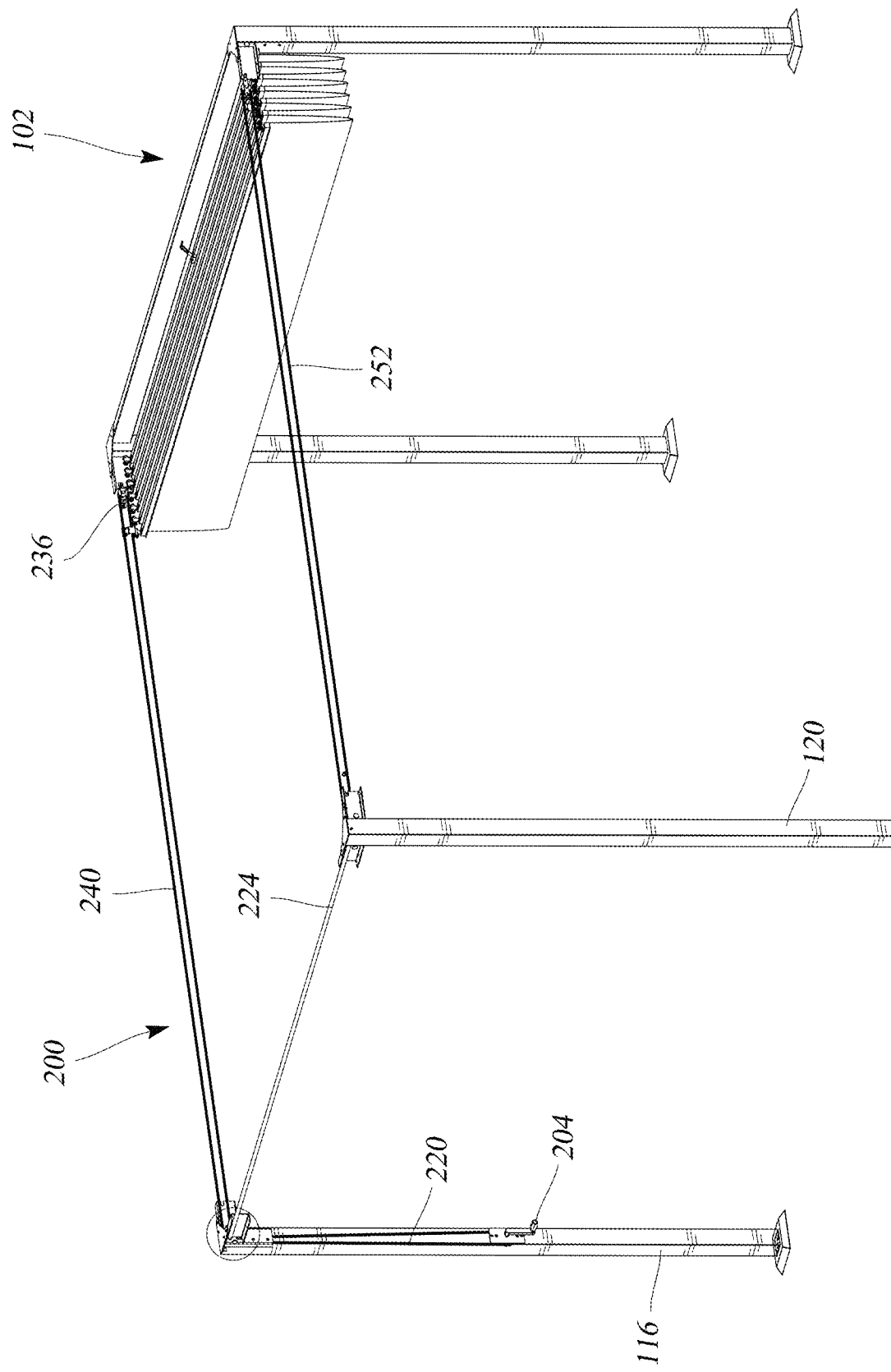
FIG. 2A is a view similar to FIG. 2 but with some external structure removed to reveal a transmission used to move the retractable shade assembly between the configurations of FIG. 1 and FIG. 2.
Figure 2B:
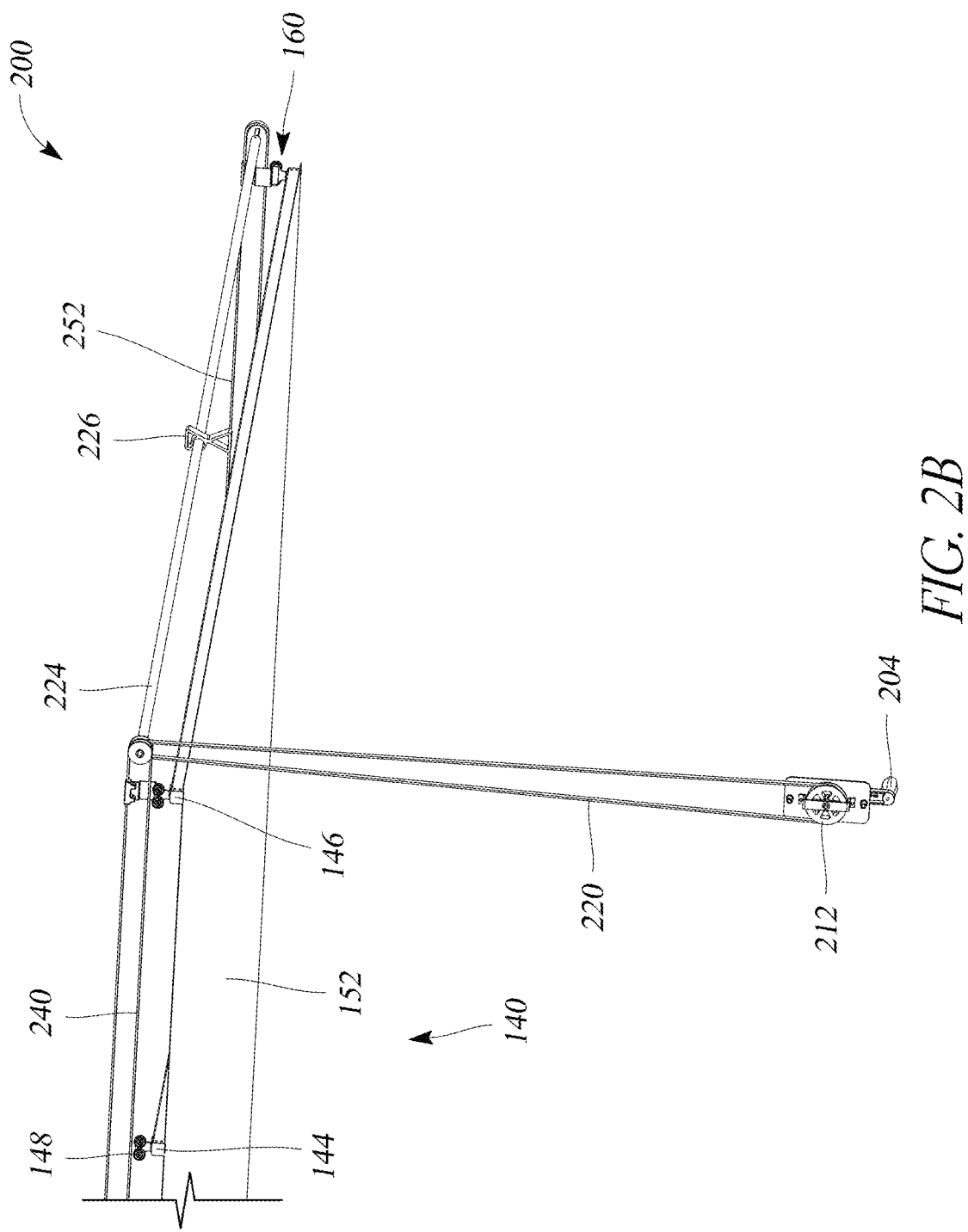
FIG. 2B is a bottom perspective view of a transmission and retractable shade assembly illustrating the operation of one embodiment of a shade structure.

FIG. 2A better illustrates the transmission 200 by removing the frame structure including the front beam 108, the side beam 110, and the side beam 112 of the shade structure 90. The transmission 200 can include a first belt 220, a second belt 240, and a third belt 252. The belts 220, 240, 252 can be caused to rotate upon rotation of the hand crank 204. In one embodiment the hand crank 204 rotates a first drive gear 212 about which the first belt 220 is wound. The first belt 220 can be wound about a first driven gear 216 disposed opposite of the first drive gear 212. The first driven gear 216 can be disposed at a top end 118B of the upright pole 116. The first driven gear 216 can be rotatably coupled with the extrusion connector 136, directly or indirectly.

The transmission 200 is configured such that rotation of the first driven gear 216 causes rotation of other drive and driven elements. The first driven gear 216 can be coupled with a second drive gear 232. The second drive gear 232 can be coupled with the first driven gear 216 in a gear assembly 234 (see FIG. 3A-1). The gear assembly 234 provides that rotation of the first driven gear 216 causes rotation of the second drive gear 232. The second drive gear 232 can drive a transmission element disposed between the second drive gear 232 and a second driven gear 236. The transmission element can be a second belt 240 disposed between the second drive gear 232 and the second driven gear 236. The second belt 240 can be coupled with the drive bar 146 of the shade section assembly 140 by the connection assembly 160 as discussed above.

In some cases, the retractable shade assembly 102 is separately driven at both sides. The transmission 200 can include a transmission shaft 224 coupled with the first driven gear 216. The transmission shaft 224 can extend through a dedicated space in the extrusion 130 of the front beam 108. The transmission shaft 224 can be coupled at a first end with a recess in the first driven gear 216 and can be coupled at an opposite end with a third drive gear 244. A support 226 can support the transmission shaft 224 in a mid-section thereof disposed within the front beam 108. More than one support 226 can be provided as needed to support the transmission shaft 224. The third drive gear 244 can be coupled with a third driven gear 248 by a third belt 252. The third belt 252 is one example of a transmission member that can be used to couple the third drive gear 244 with the third driven gear 248. Other examples for transferring rotation from the hand crank 204 are discussed below.

FIGS. 4 and 6-7 shows connection of the third belt 252 to the retractable shade assembly 102 and to the frame assembly 100. A connection assembly 160 is provided between the third belt 252 and the drive bar 146. The toothed member 168 is coupled with the toothed side of the third belt 252. A bracket 172 is coupled with the toothed member 168 and with the guide 176 as discussed above. The guide 176 is configured to slide or roll in the guide channel 126 of the extrusion 122 of the side beam 112 (see FIGS. 6-7). Movement of the third belt 252 moves the connection assembly 160 which moves the drive bar 146. The shade section 152 is coupled with a bottom surface of the drive bar 146. As such, movement of the toothed member 168 toward the front beam 108 extends and in some cases stretches the shade section 152. Movement of the toothed member 168 away from the front beam 108 retracts and in some cases causes a loop or loops of the shade section 152 to form between the drive bar 146 and an adjacent elongate bar 144. Movement of the drive bar 146 away from the front beam 108 moves the adjacent elongate bar 144 to retract the shade section 152 and in some cases causes a loop or loops of the shade section 152 to form between adjacent elongate bars 144. Aspects of the transmission 200 within the side beam 110 can be the same as aspects of the transmission 200 in the side beam 112. Aspects of the transmission 200 within the side beam 112 can be the same as aspects of the transmission 200 in the side beam 110.

Figure 8:
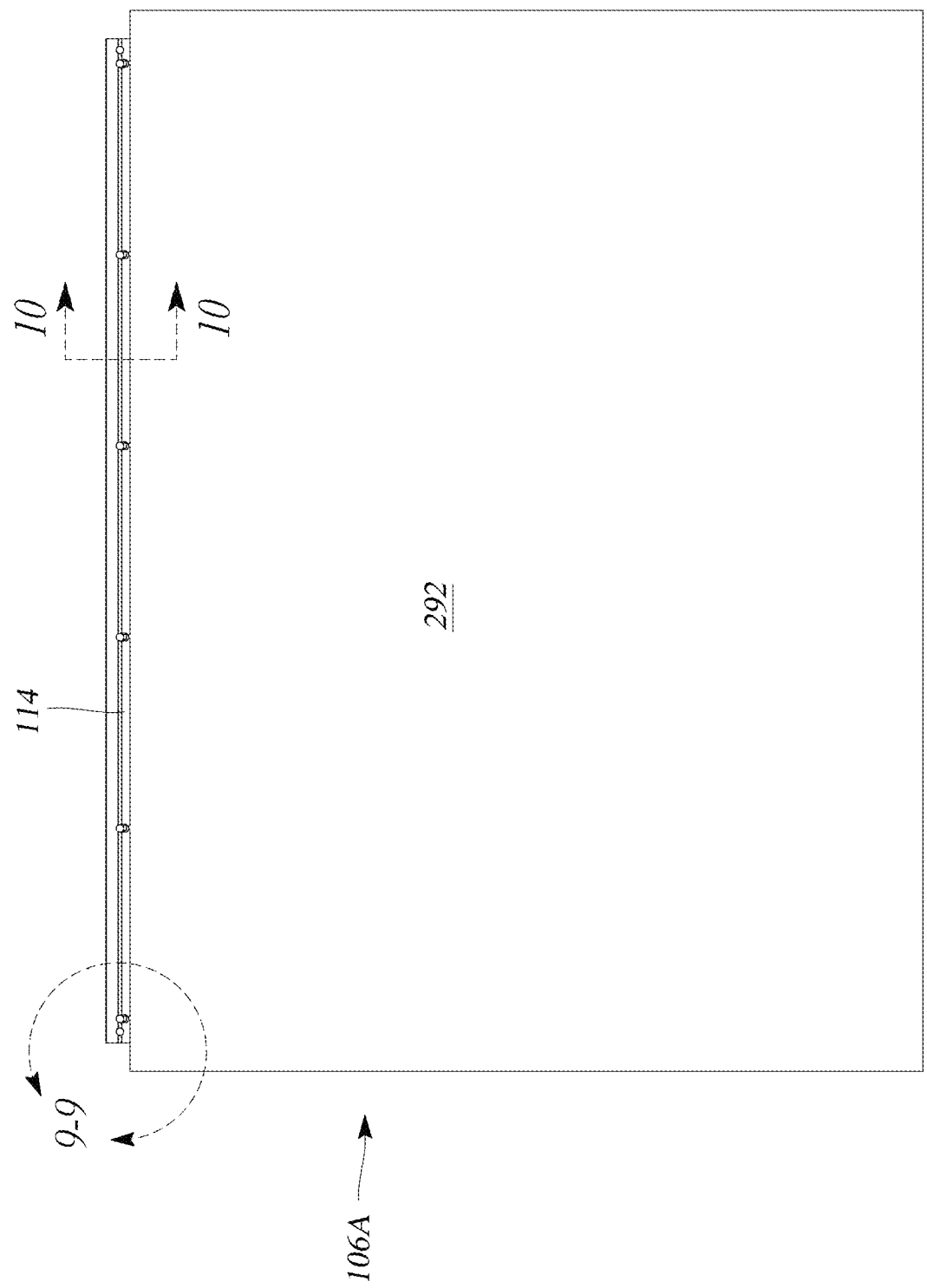
FIG. 8 is a side view of a removable shade panel assembly.
Figure 9:
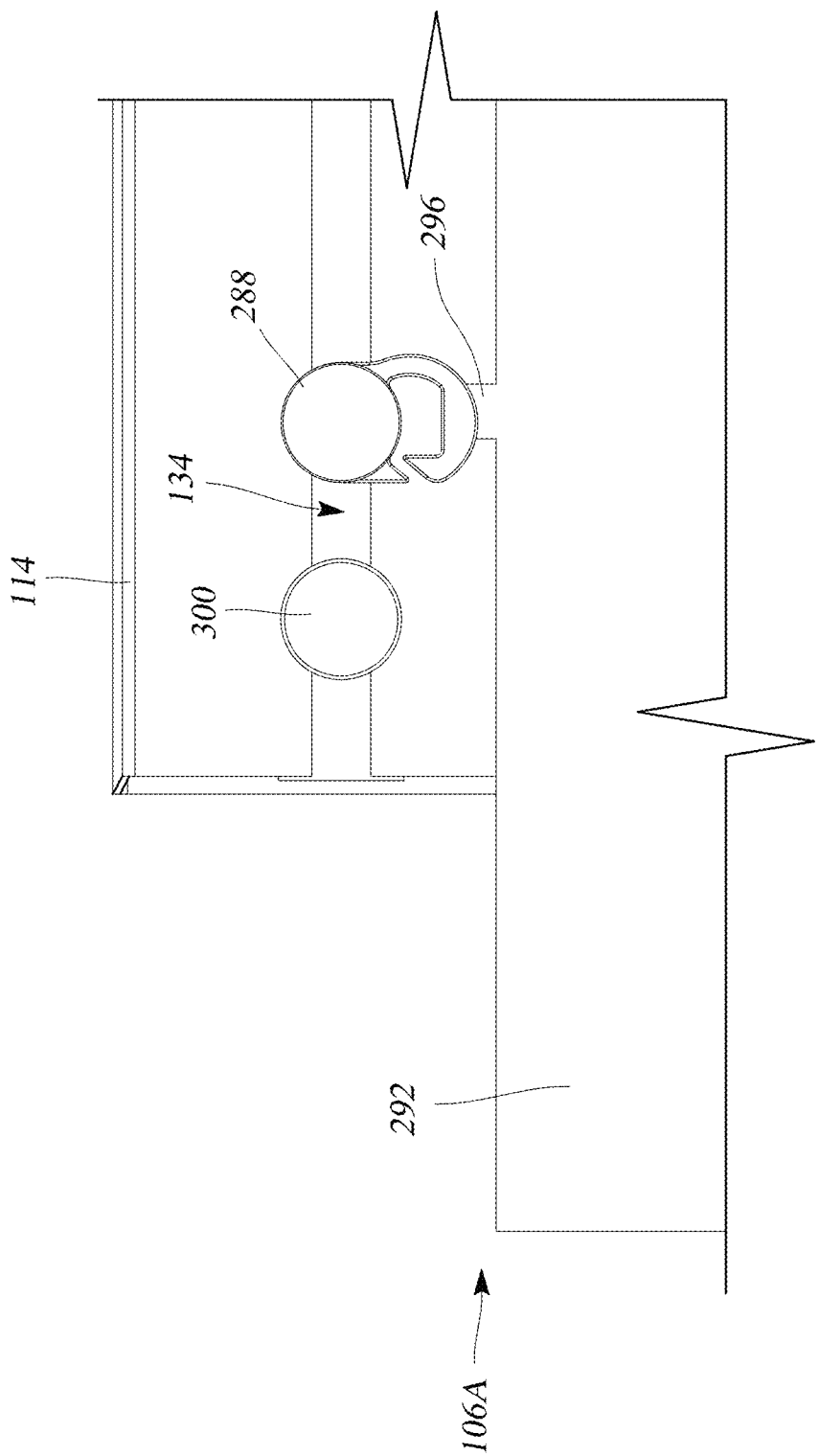
FIG. 9 is a detail view of the removable shade panel assembly taken at the area 9-9 seen in FIG. 8.
Figure 10:
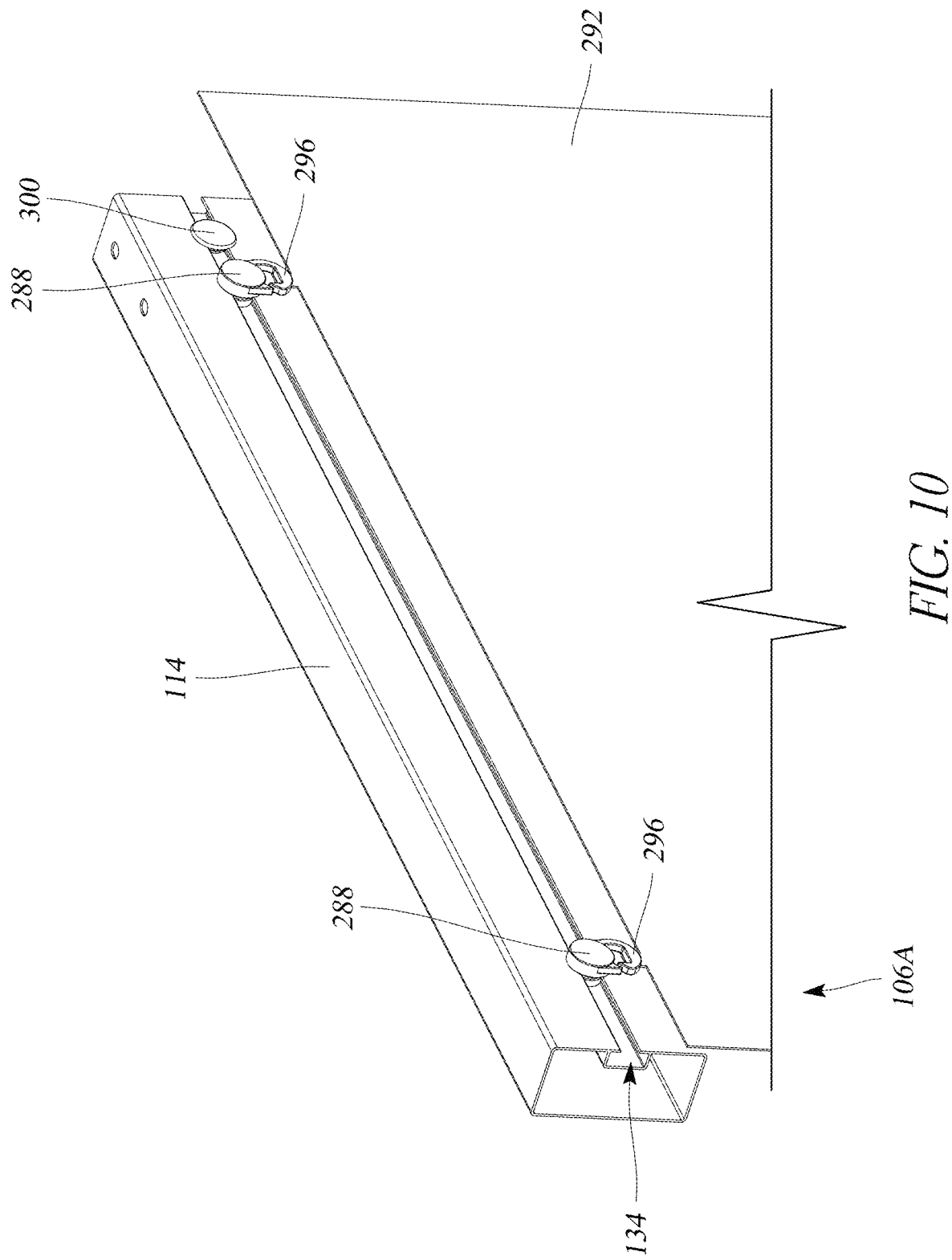
FIG. 10 is a cross-section taken at the area 10-10 seen in FIG. 8, viewed from a top-side perspective.
Figure 11:
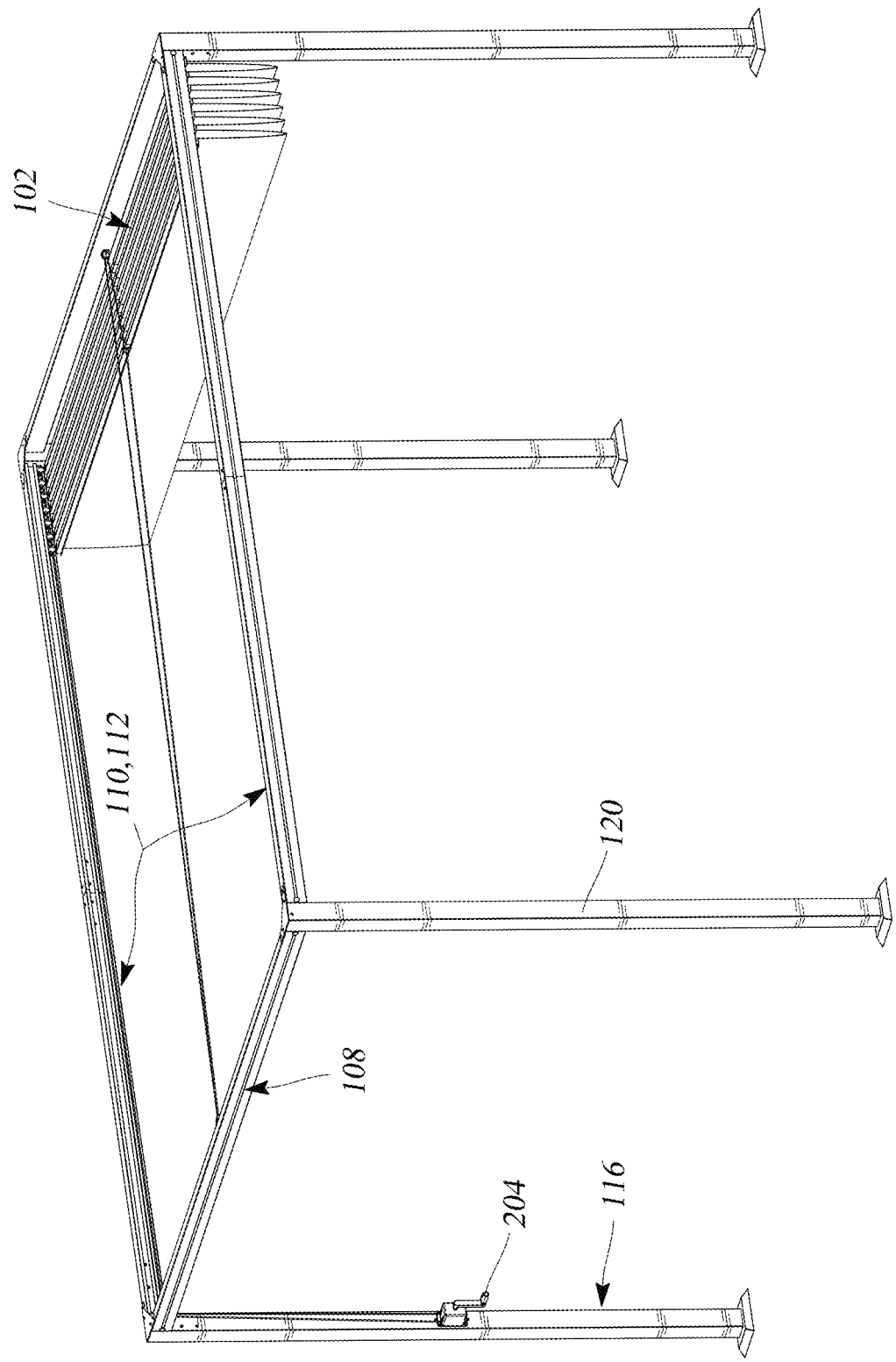
FIG. 11 is a modified embodiment of the shade structure shown in FIG. 1.
Figure 11B:
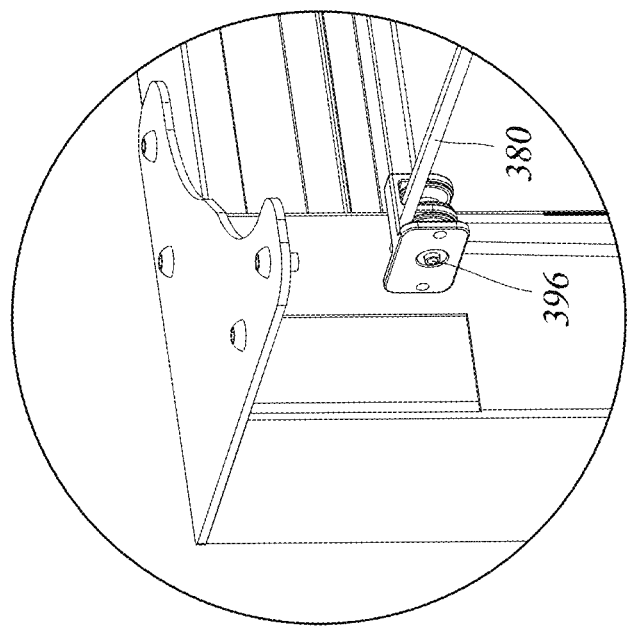
Figure 11A:
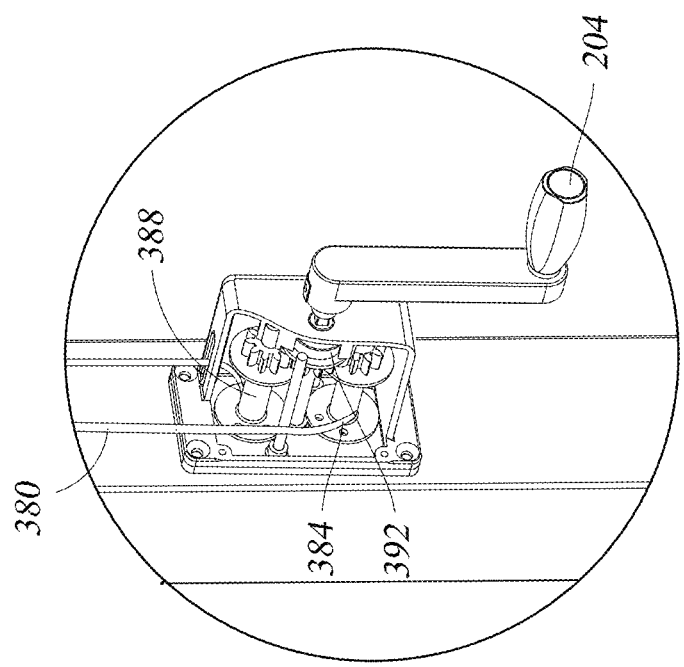

As discussed above, a removable shade panel assembly 106A and/or a removable shade panel assembly 106B can be coupled with the frame assembly 100 to provide shade as desired. As the sun move lower in the sky, shade from a vertically oriented or supported member better blocks the sun light. FIGS. 8-9 illustrate various removable assemblies that can be provided. The removable shade panel assembly 106A includes a shade section 292 that can be supported vertically by connection to an overhead beam, e.g., to the rear beam 114. The rear beam 114 can include an extrusion with one or more internal spaces disposed therein. The rear beam 114 can include a guide channel 134 in which one or a plurality of clips 288 can be mounted. The clip 288 can be slidably mounted in the guide channel 134. The clip 288 can be moved to a range of positions by virtue of the guide channel 134. A stop 300 can be provided at one or both ends of the elongate bar rear beam 114. The stop 300 can be fixed in position along the guide channel 134. The shade section 292 can include a loop member 296 for engaging the clip 288. The loop member 296 can slide into a hook-like portion of the clip 288 to hold the shade section 292. In one example, the removable shade panel assembly 106A includes six clips 288 and six loop member 296 to support and distribute the weight of the shade section 292 on the rear beam 114. The connection of the removable shade panel assembly 106B to the frame assembly 100 can be similar to or the same as the removable shade panel assembly 106A. The removable shade panel assembly 106B can have a similar configuration as the removable shade panel assembly 106A.

The foregoing discussion describes the transmission 200 incorporating drive belts to transfer rotation of the hand crank 204 of the drive system 190 into linear motion of the drive bar 146 of the retractable shade assembly 102. The first belt 220, the second belt 240, and the third belt 252 provide the advantage of being light weight and also reliably providing for movement of the retractable shade assembly 102.

Figure 3:
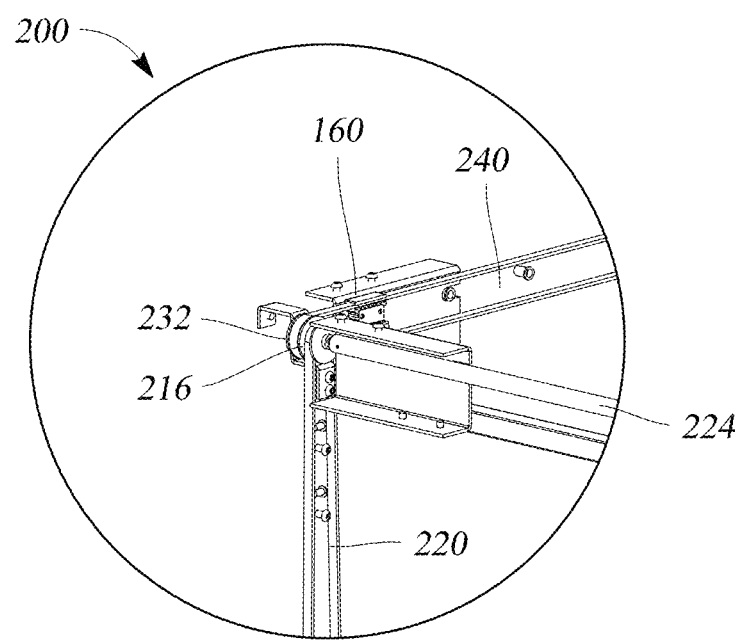
FIG. 3 is a perspective view of a corner assembly of the shade structure of FIG. 1 with some external structure removed to reveal a portion of a transmission that can allow simultaneous movement of opposite sides of the retractable shade assembly.
Figures 1, 3B:
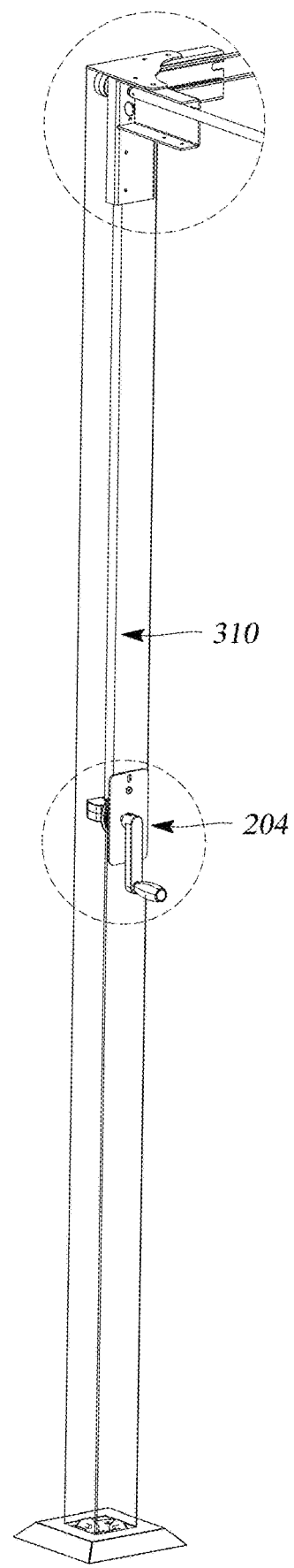
Figures 3, 3B, 4, 5:
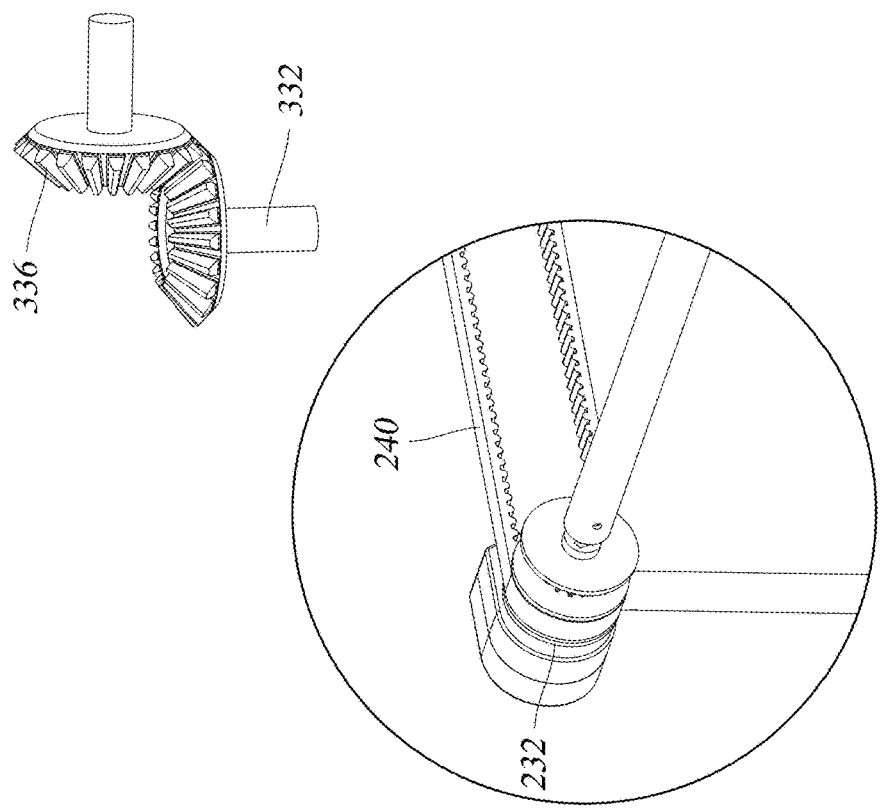
Figures 3, 3B, 4:
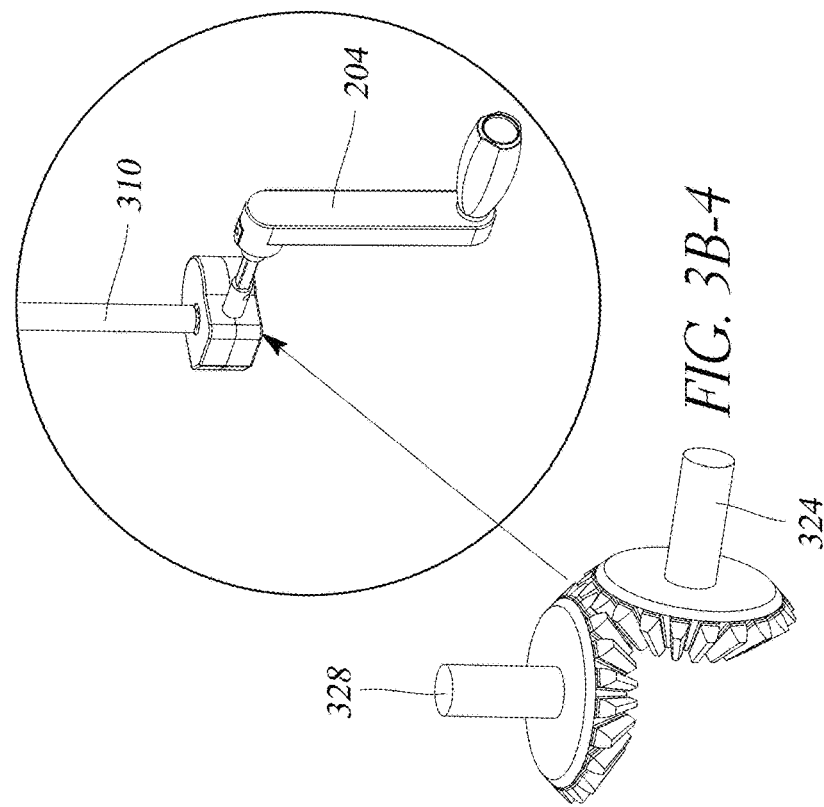
Figures 1, 3C:
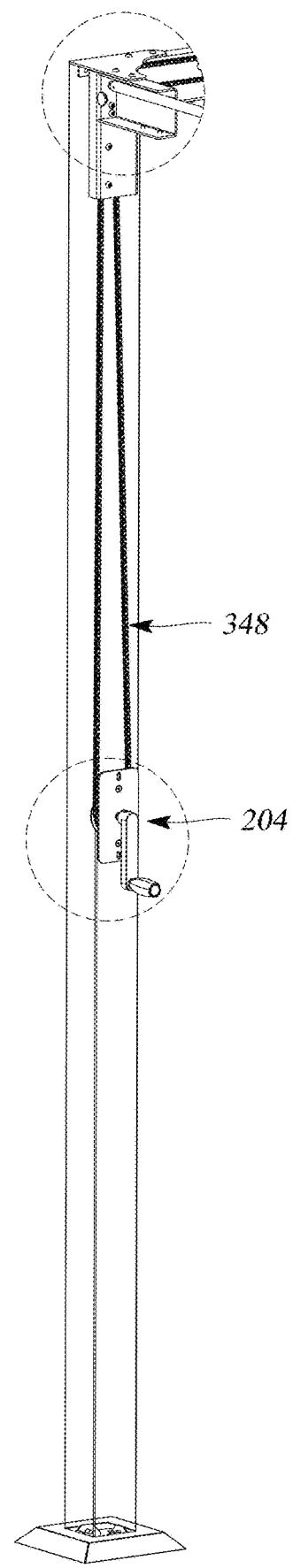
Figures 3, 3C, 4:
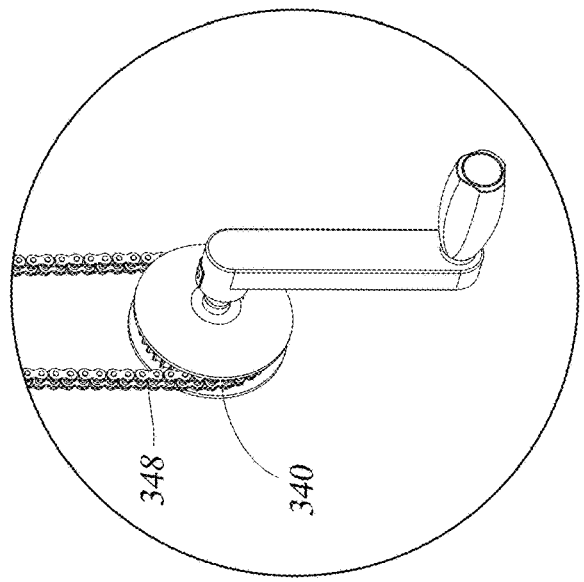
Figures 3, 3C:
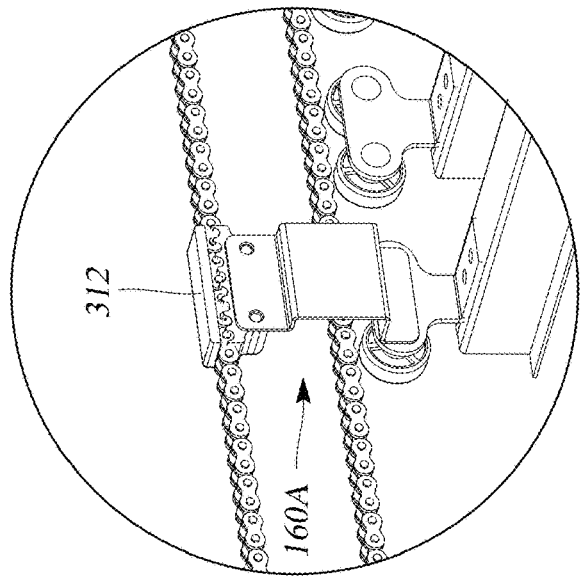
Figures 2, 3C:
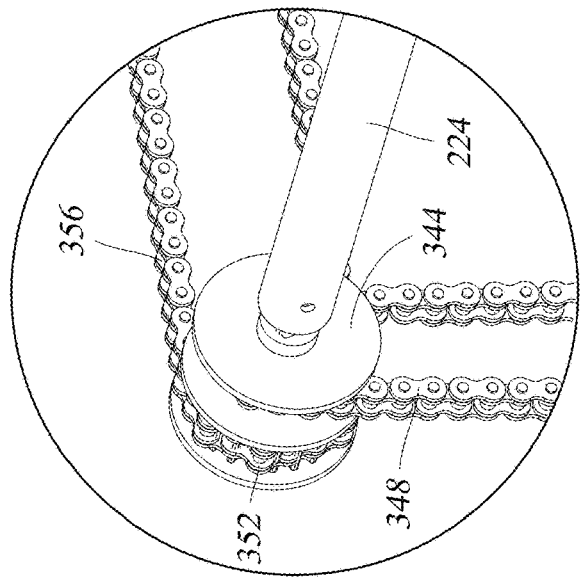
Figure 5:
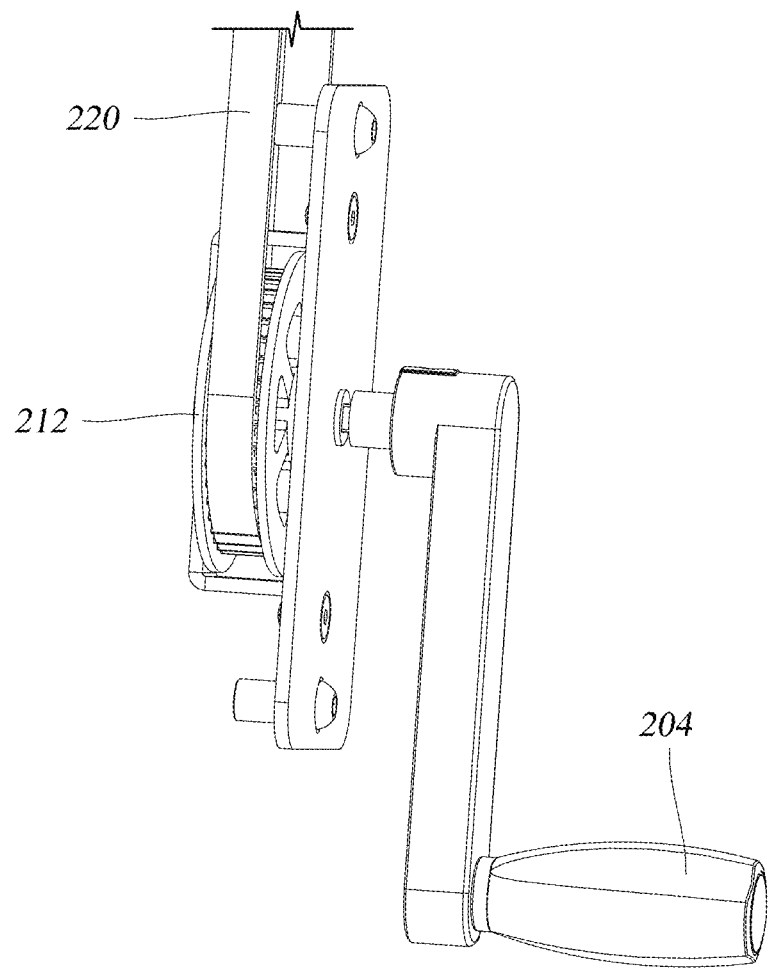

FIG. 3B-1 to FIG. 3B-5 show modified embodiments of the shade structure 90 that incorporates a gear and shaft drive into the transmission 200. FIG. 3B-1 to FIG. 3B-3 show the hand crank 204 is coupled with a first worm gear 304. The first worm gear 304 is engaged with a first driven gear 308 in a gearbox 309 disposed in or supported by the upright pole 116. The first driven gear 308 is coupled with a drive shaft 310 at a lower end of the shaft 310. An upper end of the drive shaft 310 is coupled with a second worm gear 312. The second worm gear 312 rotates with rotation of the drive shaft 310. The second worm gear 312 drives rotation of a second driven gear 316. The second driven gear 316 can be coupled with the second drive gear 232 to drive the second belt 240. The second driven gear 316 can be coupled with the transmission shaft 224 to provide for rotation of the transmission shaft 224.

FIG. 3B-4 to FIG. 3B-5 show a further modified embodiment of the transmission 200. As discussed, in connection with the embodiment of FIG. 3B-1 to FIG. 3B-3, a gear drive can be provided between the hand crank 204 and one or more belts mounted in the side beam 110 and the side beam 112. The gear drive can include a first drive bevel gear 324 coupled with the hand crank 204. Rotation of the hand crank 204 can directly drive the first drive bevel gear 324. The first drive bevel gear 324 can act on a first driven bevel gear 328. The first driven bevel gear 328 can be coupled with the drive shaft 310, described above. The drive shaft 310 can be coupled at a top end thereof with a second drive bevel gear 332. The second drive bevel gear 332 can be coupled with a second driven bevel gear 336 to drive the transmission shaft 224 and also to drive the second drive gear 232 and thereby the second belt 240. The gear and shaft drive of the modified embodiments of FIG. 3B-1 to FIG. 3B-5 provide the advantage of being more robust and less subject to wear and requiring of maintenance than a system conveying torque between the hand crank 204 and a gear with a drive belt.

FIG. 3C-1 to FIG. 3C-4 illustrate further modified embodiments in which a chain conveys torque between the hand crank 204 and elements of the transmission 200. The hand crank 204 can rotate a first drive sprocket 340 coupled with a first driven sprocket 344 by a first chain 348. The first driven sprocket 344 can rotate with a second drive sprocket 352. The second drive sprocket 352 can rotate and can be engaged with a second chain 356 to rotate the chain. The second chain 356 can be coupled with a second driven sprocket to support the rotation of the second chain 356. A connection assembly 160A can couple the second chain 356 to the drive bar 146. The connection assembly 160A can have a chain clamp 360 configured to engage and retain the bracket 172 on the second chain 356. The chain clamp 360 can include a linear array of sprocket teeth. The first driven sprocket 344 can be coupled with the transmission shaft 224, which can drive a belt or a chain disposed in the side beam 112 at an end of the transmission shaft 224 opposite to the first driven sprocket 344. A chain drive can be more robust and require less maintenance than a belt. Because a chain is heavier than a belt, a support similar to the support 226, discussed above, can be disposed in an extrusion of the side beam 110 or the side beam 112.

FIG. 11A-11E illustrate a modified embodiment of the shade structure 90 in which the transmission 200 is modified to provide movement of the retractable shade assembly 102 by including a tension member drive system. The components of the shade structure 90 discussed above can be provided in the embodiment of FIGS. 11A-11E. In addition, the hand crank 204 can be coupled with the modified transmission 200 as follows. The transmission includes an extension spool 384 about which one end of the tension member 380 can be wound and un-wound. The transmission includes a retraction spool 388 coupled with one end of a tension member, e.g., the tension member 380. The extension spool 384 and the retraction spool 388 can be rotated simultaneously by a gear train 392. The gear train 392 can be rotated upon rotation of the hand crank 204. The tension member 380 can be routed through the upright pole 116 from a gear train 392 to the top end 118B of the upright pole 116. The tension member 380 can be routed through a pulley 396 to direct the tension member 380 along or through the front beam 108 of the frame assembly 100. The tension member 380 can be routed through a first transfer mechanism 404 and a second transfer mechanism 408 to direct the tension member 380 along a top side of the retractable shade assembly 102. The tension member 380 can be routed through a pulley 400 coupled with the rear beam 114. The tension member 380 can be coupled with an end connection 412 on one end with a first side of the drive bar 146. The tension member 380 can be coupled at one end with the end connection 412 on another side of the drive bar 146 opposite the first side thereof.

Operation of the shade structure 90 incorporating the modified embodiment of the transmission 200 including the tension member 380 can be as follows. If the retractable shade assembly 102 is to be retracted, the hand crank 204 can be cranked to cause the tension member 380 to be wound around the extension spool 384. The winding of the tension member 380 around the extension spool 384 moves the end of the tension member 380 coupled with the end connection 412 toward the front beam 108, thereby extending the retractable shade assembly 102. If the retractable shade assembly 102 is extended, the retractable shade assembly 102 can be retracted by winding the tension member 380 around the retraction spool 388. The rotation of the retraction spool 388 causes the length of the tension member 380 extending from the pulley 400 to the end connection 412 to move toward the pulley 400 as the opposite tend is wound around the retraction spool 388. The modified embodiment of FIGS. 11A-11E provide a relatively light-weight and simple construction of the retractable shade assembly 102 including the tension member 380. The tension member 380 can be replaced as need by simply threading a new tension member through the extension spool 384, the retraction spool 388, the pulleys 396, 400, and the first transfer mechanisms 404, 408.

The cover assembly 104 includes a shelter layer 420 disposed above the retractable shade assembly 102 when the assembly 102 is retracted. The shelter layer 420 can be coupled with a horizontal member of the frame assembly 100. A support rod 424 can be coupled with the side beam 110 by a first bracket 428. A support rod 424 can be coupled with the side beam 112 by a first bracket 428. The cover assembly 104 can be disposed above the elevation of the guide channels 126 such that the guide 148 can be retracted and extended under the cover assembly 104. The shelter layer 420 can extend from the rear beam 114 toward the front beam 108. The length of the shelter layer 420 in the front to back direction preferably is more than the combined thickness in the same direction of the elongate bars 144 and the drive bar 146. As such, all of the loops of the shade section 152 in the retracted configuration can be disposed below the cover assembly 104. The cover assembly 104 can extend over and protect the retracted retractable shade assembly 102 from the elements, including the sun and impact from falling objects.

Conditional language, such as "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements, and/or steps are in any way required for one or more implementations or that one or more implementations necessarily include logic for deciding, with or without user input or prompting, whether these features, elements, and/or steps are included or are to be performed in any particular implementation.

The terms "approximately," "about," and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount. As another example, in certain implementations, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

Some implementations have been described in connection with the accompanying drawings. However, it should be understood that the figures are not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various implementations can be used in all other implementations set forth herein. Additionally, it will be recognized that any methods described herein may be practiced using any device suitable for performing the recited steps.

For purposes of this disclosure, certain aspects, advantages, and novel features are described herein. It is to be understood that not necessarily all such advantages may be achieved in accordance with any particular implementation. Thus, for example, those skilled in the art will recognize that the disclosure may be embodied or carried out in a manner that achieves one advantage or a group of advantages as taught herein without necessarily achieving other advantages as may be taught or suggested herein.

Although these inventions have been disclosed in the context of certain preferred implementations and examples, it will be understood by those skilled in the art that the present inventions extend beyond the specifically disclosed implementations to other alternative implementations and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the implementations may be made and still fall within the scope of the inventions. It should be understood that various features and aspects of the disclosed implementations can be combined with or substituted for one another in order to form varying modes of the disclosed inventions. Further, the actions of the disclosed processes and methods may be modified in any manner, including by reordering actions and/or inserting additional actions and/or deleting actions. Thus, it is intended that the scope of at least some of the present inventions herein disclosed should not be limited by the particular disclosed implementations described above. The limitations in the claims are to be interpreted broadly based on the language employed in the claims and not limited to the examples described in the present specification or during the prosecution of the application, which examples are to be construed as non-exclusive.

What is claimed is:

1. A shade structure, comprising:
    a frame assembly comprising a plurality of upright poles and a plurality of beams coupled therewith;
    a retractable shade assembly coupled with the plurality of beams, the retractable shade assembly comprising a shade section assembly comprising a plurality of elongate bars and a shade section extending therebetween; and
    a drive system comprising a transmission configured to extend the retractable shade assembly to an extended shade configuration and to retract the retractable shade assembly to a retracted configuration,
    wherein the plurality of beams includes a first side beam and a second side beam, each side beam comprising an extrusion that forms:
        a guide channel extending along a length of the beam, the guide channel comprising an elongate opening extending along an inner side of the guide channel; and
        a transmission channel extending along the length of the beam and positioned above the guide channel, the transmission channel configured to retain a portion of the transmission, and the transmission channel comprising an elongate opening extending along an inner side of the transmission channel,
    wherein each bar of the plurality of elongate bars comprises a first end and a second end each having a guide coupled thereto, each guide being at least partially disposed in a guide channel of one of the side beams and extending through the elongate opening of the guide channel,
    wherein the first and second ends of a drive bar of the plurality of elongate bars are each coupled to the transmission by a bracket that extends through the elongate opening of the transmission channel of one of the side beams, and
    wherein the elongate bars are spread apart from each other to spread the shade section in the extended shade configuration and the elongate bars are moved toward each other in the retracted configuration with the shade section looped vertically between adjacent elongate bars.

2. The shade structure of claim 1, wherein an outer side of the transmission channel and an outer side of the guide channel are aligned with one another.

3. The shade structure of claim 1, wherein the transmission channel has a C-shaped profile, and the guide channel has a C-shaped profile.

4. The shade structure of claim 1, wherein the guides each comprise a plurality of rollers.

5. The shade structure of claim 1, wherein the inner side of the guide channel is recessed outwardly with respect to the inner side of the transmission channel.

6. The shade structure of claim 1, wherein the drive system comprises a crank configured to apply a torque to the transmission, the crank being mechanically coupled to the transmission by a belt, a chain or a shaft.

7. The shade structure of claim 1, wherein the transmission comprises a plurality of sprockets and a chain disposed therebetween, the chain comprising links configured to mesh with the plurality of sprockets, the chain being coupled with a connection assembly that comprises the bracket.

8. The shade structure of claim 1,
    wherein one of the plurality of beams is a transverse beam disposed between and connecting the first side beam and the second side beam, the transverse beam comprising an extrusion comprising a transmission channel configured to retain a portion of the transmission configured to move the retractable shade assembly between the retracted configuration and the extended shade configuration.

9. The shade structure of claim 1, wherein the shade section comprises a plurality of looped sections formed between adjacent elongate bars, a first shade section disposed between first and second elongate bars, and a second shade section disposed between a third elongate bar and one of the first and second elongate bars.

10. The shade structure of claim 1, wherein the transmission includes a tension member configured move the elongate bars apart to spread the shade section apart in the extended shade configuration and to move the elongate bars toward each other in the retracted configuration, and
wherein the transmission further comprises a spool coupled with a first end portion of the tension member, a second end portion of the tension member coupled with the drive bar, wherein winding the first end portion of the tension member around the spool causes an extension force to be applied to the drive bar, the spool unwinding the tension member upon application of a retraction force opposite the extension force, and
wherein a portion of the tension member is suspended over the retractable shade assembly.

11. The shade structure of claim 1, further comprising a cover assembly supported by the frame assembly to shelter the shade section looped vertically in the retracted configuration.

12. The shade structure of claim 1, wherein the transmission comprises a plurality of gears and a belt disposed therebetween, the belt comprising teeth configured to mesh with teeth of the plurality of gears, the belt being coupled with a connection assembly that comprises the bracket.

13. The shade structure of claim 12, wherein the connection assembly further comprises a toothed member coupled with the teeth of the belt.

14. The shade structure of claim 13, wherein the bracket is rigidly coupled with the drive bar of the shade section assembly.

15. The shade structure of claim 12, wherein the plurality of gears is a first plurality of gears and the belt is a first belt, the first plurality of gears and the first belt being coupled with the first side beam, the transmission further comprising a second plurality of gears coupled with a second horizontal belt, the second horizontal belt being coupled with the second side beam.

16. The shade structure of claim 15, wherein the transmission further comprises a transmission shaft having a first end coupled to a gear of the first plurality of gears, and a second end coupled to a gear of the second plurality of gears.

17. The shade structure of claim 16, wherein the transmission shaft is positioned within an interior space of a beam that extends between the first side beam and the second side beam.

18. A shade structure, comprising:
a frame assembly comprising a plurality of upright poles, a plurality of side beams coupled with top ends of the upright poles, and a front beam extending between two of the upright poles;
a retractable shade assembly comprising a shade section assembly comprising a plurality of elongate bars, a drive bar, and a shade section, each of the elongate bars coupled with the side beams by a guide, the drive bar coupled with the side beams by a connection assembly; and
a drive system comprising a hand crank coupled to one of the upright poles and coupled with a transmission coupled with one or more of the side beams, the drive system being configured to operate the transmission to drive the drive bar to extend the retractable shade assembly to a shade configuration and to retract the retractable shade assembly to a retracted configuration, wherein each of the one or more side beams to which the transmission is coupled comprises an extrusion that forms:
a guide channel extending along a length of the beam, the guide channel comprising an elongate opening extending along an inner side of the guide channel, with at least some of the guides extending through the elongate opening; and
a transmission channel extending along the length of the beam and positioned above the guide channel, the transmission channel configured to retain a portion of the transmission, and the transmission channel comprising an elongate opening extending along an inner side of the transmission channel, with at least part of the connection assembly extending through the elongate opening of the transmission channel, and
wherein the elongate bars are spread apart from each other to spread the shade section in the shade configuration and the elongate bars are moved toward each other in the retracted configuration with the shade section looped vertically between adjacent elongate bars.

19. The shade structure of claim 18, wherein the transmission comprises a toothed belt coupled with a drive gear at one end and with a driven gear at a second end, the toothed belt coupled with a toothed member of the connection assembly coupled with the drive bar.

20. The shade structure of claim 19, wherein the connection assembly is rigidly coupled with the drive bar, and wherein the connection assembly comprises a plurality of rollers positioned within the guide channel of one of the one or more side beams to which the transmission is coupled.

21. The shade structure of claim 19, wherein the toothed belt comprises a first toothed belt, the toothed member comprises first toothed member coupled with a first end of the drive bar and wherein the transmission comprises a second toothed belt coupled with a second toothed member of a connection assembly coupled with a second end of the drive bar.

22. The shade structure of claim 21, wherein the first toothed belt and the toothed member are disposed in the transmission channel of a first side beam of the one or more side beams to which the transmission is coupled, and the second toothed belt and the second toothed member are disposed in the transmission channel of a second side beam of the one or more side beams to which the transmission is coupled.

23. The shade structure of claim 22, wherein the transmission comprises a chain, a gear driving drive shaft, or a string section disposed between the hand crank and a driven sprocket, a driven gear, or a pulley aligned with a channel disposed through one of the side beams and/or the front beam.

24. A shade structure, comprising:
a frame assembly comprising a plurality of upright poles and a plurality of beams coupled therewith, the plurality of beams comprising a front beam, a rear beam, and two side beams;
a retractable shade assembly coupled with the plurality of beams, the retractable shade assembly comprising a shade section assembly comprising a plurality of elongate bars and a shade section extending therebetween; and
a drive system configured to extend the retractable shade assembly and to retract the retractable shade assembly, the drive system including a hand crank, a first pulley coupled to the front beam, a second pulley coupled to the rear beam, and a tension member having a first end configured to be wound by the hand crank and a second end coupled with a drive bar, wherein a portion of the tension member extends unsupported between the first pulley and the second pulley above the plurality of elongate bars;

wherein the elongate bars are spread apart from each other by tensioning the tension member on a first side of the drive bar to spread the shade section and the elongate bars are moved toward each other by tensioning the tension member on a second side of the drive bar.

25. The shade structure of claim 24, wherein the drive bar is moveably coupled at a first end of the drive bar to one of the plurality of beams by a connection assembly, the connection assembly comprising a guide positioned within a guide channel on a side of the one of the plurality of beams.

26. The shade structure of claim 25, wherein the one of the plurality of beams comprises an extrusion that forms the guide channel, the guide channel comprising an elongate opening extending along an inner side of the guide channel, wherein a portion of the connection assembly passes through the elongate opening.

* * * * *